United States Patent
Nallathambi et al.

(10) Patent No.: US 10,521,308 B2
(45) Date of Patent: Dec. 31, 2019

(54) UNIFIED SNAPSHOT STORAGE MANAGEMENT, USING AN ENHANCED STORAGE MANAGER AND ENHANCED MEDIA AGENTS

(71) Applicant: Commvault Systems, Inc., Tinton Falls, NJ (US)

(72) Inventors: Vimal Kumar Nallathambi, Ocean Township, NJ (US); Manoj Kumar Vijayan, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 170 days.

(21) Appl. No.: 15/873,730

(22) Filed: Jan. 17, 2018

(65) Prior Publication Data

US 2018/0157559 A1   Jun. 7, 2018

Related U.S. Application Data

(63) Continuation of application No. 15/474,166, filed on Mar. 30, 2017, now Pat. No. 9,921,920, which is a
(Continued)

(51) Int. Cl.
*G06F 11/14* (2006.01)
*H04L 29/08* (2006.01)
(Continued)

(52) U.S. Cl.
CPC .......... *G06F 11/1451* (2013.01); *G06F 3/065* (2013.01); *G06F 3/067* (2013.01);
(Continued)

(58) Field of Classification Search
CPC .... G06F 11/1451; G06F 16/27; G06F 3/0662; G06F 3/067; G06F 3/0619; G06F 3/065;
(Continued)

(56) References Cited

U.S. PATENT DOCUMENTS 4,296,465 A   10/1981   Lemak
4,686,620 A   8/1987    Ng
(Continued)

FOREIGN PATENT DOCUMENTS

AU   2006331932   12/2006
CA   2632935      12/2006
(Continued)

OTHER PUBLICATIONS

Armstead et al., "Implementation of a Campus-Wide Distributed Mass Storage Service: The Dream vs. Reality," IEEE, 1995, pp. 190-199.
(Continued)

*Primary Examiner* — Robert Stevens
(74) *Attorney, Agent, or Firm* — Commvault Systems, Inc.

(57) ABSTRACT

An illustrative approach to managing snapshots streamlines how and when snapshots are generated in a storage management system, such that fewer snapshots may be generated without diminishing the scope of data protection. A novel unified-snapshot storage policy may govern snapshots for any number of subclients. A unified-snapshot job based on the unified-snapshot storage policy enables the illustrative storage management system to automatically discover relevant components and generate at most one snapshot per target logical unit number ("LUN") in a storage array. Each snapshot may comprise the data of any number of subclients and/or clients in the storage management system. Accordingly, one unified-snapshot job may yield a minimum but sufficient number of snapshots comprising data of all subclients associated with the governing unified-snapshot storage policy. An enhanced storage manager may manage the unified-snapshot jobs. One or more enhanced media agents
(Continued)

and/or data agents may participate in the unified-snapshot jobs and in subsequent cataloguing of the snapshots.

20 Claims, 11 Drawing Sheets

Related U.S. Application Data continuation of application No. 14/542,360, filed on Nov. 14, 2014, now Pat. No. 9,648,105.

(51) Int. Cl.
  *G06F 16/27* (2019.01)
  *G06F 3/06* (2006.01)
  *G06F 16/28* (2019.01)
(52) U.S. Cl.
  CPC .......... *G06F 3/0619* (2013.01); *G06F 3/0662* (2013.01); *G06F 11/1461* (2013.01); *G06F 16/27* (2019.01); *G06F 16/28* (2019.01); *H04L 67/1097* (2013.01); *G06F 2201/84* (2013.01)
(58) Field of Classification Search
  CPC .. G06F 11/1461; G06F 2201/84; G06F 16/28; H04L 67/1451; H04L 67/1097
  USPC ........................................................ 707/716
  See application file for complete search history.

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi et al. |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,604,862 A | 2/1997 | Midgely et al. |
| 5,615,392 A | 3/1997 | Harrison et al. |
| 5,619,644 A | 4/1997 | Crockett et al. |
| 5,638,509 A | 6/1997 | Dunphy et al. |
| 5,673,381 A | 9/1997 | Huai et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitsky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,819,292 A | 10/1998 | Hitz et al. |
| 5,829,046 A | 10/1998 | Tzelnic et al. |
| 5,835,953 A | 11/1998 | Ohran |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,938,135 A | 8/1999 | Sasaki et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,061,692 A | 5/2000 | Thomas et al. |
| 6,072,490 A | 6/2000 | Bates et al. |
| 6,076,148 A | 6/2000 | Kedem et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |
| 6,212,512 B1 | 4/2001 | Barney et al. |
| 6,212,521 B1 | 4/2001 | Minami et al. |
| 6,230,164 B1 | 5/2001 | Rikieta et al. |

(56) References Cited

U.S. PATENT DOCUMENTS

| | | |
|---|---|---|
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,421,711 B1 | 7/2002 | Blumenau et al. |
| 6,434,681 B1 | 8/2002 | Amangau |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,909 B1 | 4/2003 | Tamer et al. |
| 6,557,089 B1 | 4/2003 | Reed et al. |
| 6,564,228 B1 | 5/2003 | O'Connor |
| 6,581,143 B2 | 6/2003 | Gagne et al. |
| 6,594,744 B1 | 7/2003 | Humlicek et al. |
| 6,604,118 B2 | 8/2003 | Kleinman et al. |
| 6,604,149 B1 | 8/2003 | Deo et al. |
| 6,606,690 B2 | 8/2003 | Padovano |
| 6,615,223 B1 | 9/2003 | Shih et al. |
| 6,631,477 B1 | 10/2003 | LeCrone et al. |
| 6,631,493 B2 | 10/2003 | Ottesen et al. |
| 6,643,671 B2 | 11/2003 | Milillo et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,728,733 B2 | 4/2004 | Tokui |
| 6,728,736 B2 | 4/2004 | Hostetter et al. |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,763,351 B1 | 7/2004 | Subramaniam et al. |
| 6,789,161 B1 | 9/2004 | Blendermann et al. |
| 6,792,518 B2 | 9/2004 | Armangau et al. |
| 6,799,258 B1 | 9/2004 | Linde |
| 6,836,779 B2 | 12/2004 | Poulin |
| 6,871,163 B2 | 3/2005 | Hiller et al. |
| 6,871,271 B2 | 3/2005 | Ohran et al. |
| 6,877,016 B1 | 4/2005 | Hart et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,898,688 B2 | 5/2005 | Martin et al. |
| 6,912,482 B2 | 6/2005 | Kaiser |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,948,038 B2 | 9/2005 | Berkowitz et al. |
| 6,948,089 B2 | 9/2005 | Fujibayashi |
| 6,952,705 B2 | 10/2005 | Knoblock et al. |
| 6,952,758 B2 | 10/2005 | Chron et al. |
| 6,954,834 B2 | 10/2005 | Slater et al. |
| 6,957,362 B2 | 10/2005 | Armangau |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,032,131 B2 | 4/2006 | Lubbers et al. |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,072,915 B2 | 7/2006 | Kaczmarski et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,096,315 B2 | 8/2006 | Takeda et al. |
| 7,100,089 B1 | 8/2006 | Phelps |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,111,026 B2 | 9/2006 | Sato |
| 7,120,757 B2 | 10/2006 | Tsuge |
| 7,130,860 B2 | 10/2006 | Pachet |
| 7,139,887 B2 | 11/2006 | Colgrove et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,165,079 B1 | 1/2007 | Chen et al. |
| 7,174,352 B2 | 2/2007 | Kleinman et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,197,665 B2 | 3/2007 | Goldstein et al. |
| 7,203,807 B2 | 4/2007 | Urabe et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,544 B2 | 6/2007 | Tan et al. |
| 7,234,115 B1 | 6/2007 | Sprauve et al. |
| 7,237,075 B2 | 6/2007 | Welsh et al. |
| 7,246,140 B2 | 7/2007 | Therrien et al. |
| 7,251,713 B1 | 7/2007 | Zhang |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Amangau et al. |
| 7,275,277 B2 | 10/2007 | Moskovich et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,296,125 B2 | 11/2007 | Ohran |
| 7,343,365 B2 | 3/2008 | Farnham et al. |
| 7,346,623 B2 | 3/2008 | Prahlad et al. |
| 7,356,657 B2 | 4/2008 | Mikami |
| 7,359,917 B2 | 4/2008 | Winter et al. |
| 7,370,232 B2 | 5/2008 | Safford |
| 7,373,364 B1 | 5/2008 | Chapman |
| 7,383,538 B2 | 6/2008 | Bates et al. |
| 7,392,360 B1 | 6/2008 | Aharoni et al. |
| 7,395,387 B2 | 7/2008 | Berkowitz et al. |
| 7,409,509 B2 | 8/2008 | Devassy et al. |
| 7,412,583 B2 | 8/2008 | Burton et al. |
| 7,415,488 B1 | 8/2008 | Muth et al. |
| 7,421,554 B2 | 9/2008 | Colgrove et al. |

(56) References Cited

U.S. PATENT DOCUMENTS

| | | |
|---|---|---|
| 7,430,587 B2 | 9/2008 | Malone et al. |
| 7,433,301 B2 | 10/2008 | Akahane et al. |
| 7,467,167 B2 | 12/2008 | Patterson |
| 7,467,267 B1 | 12/2008 | Mayock |
| 7,472,238 B1 | 12/2008 | Gokhale |
| 7,496,589 B1 | 2/2009 | Jain et al. |
| 7,496,690 B2 | 2/2009 | Beverly et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyll et al. |
| 7,523,276 B1 | 4/2009 | Shankar |
| 7,523,483 B2 | 4/2009 | Dogan |
| 7,529,748 B2 | 5/2009 | Wen et al. |
| 7,529,898 B2 | 5/2009 | Nguyen et al. |
| 7,532,340 B2 | 5/2009 | Koppich et al. |
| 7,565,572 B2 | 7/2009 | Yamasaki |
| 7,567,991 B2 | 7/2009 | Armangau et al. |
| 7,568,080 B2 | 7/2009 | Prahlad et al. |
| 7,577,806 B2 | 8/2009 | Rowan |
| 7,581,077 B2 | 8/2009 | Ignatius et al. |
| 7,587,563 B1 | 9/2009 | Teterin et al. |
| 7,596,586 B2 | 9/2009 | Gokhale et al. |
| 7,606,841 B1 | 10/2009 | Ranade |
| 7,606,868 B1 | 10/2009 | Le et al. |
| 7,610,387 B1 | 10/2009 | Liskov et al. |
| 7,613,750 B2 | 11/2009 | Valiyaparambil et al. |
| 7,617,541 B2 | 11/2009 | Plotkin et al. |
| 7,620,666 B1 | 11/2009 | Root et al. |
| 7,627,598 B1 | 12/2009 | Burke |
| 7,627,617 B2 | 12/2009 | Kavuri et al. |
| 7,664,771 B2 | 2/2010 | Kusters et al. |
| 7,668,798 B2 | 2/2010 | Scanlon et al. |
| 7,669,029 B1 | 2/2010 | Mishra et al. |
| 7,672,979 B1 | 3/2010 | Appellof et al. |
| 7,685,126 B2 | 3/2010 | Patel et al. |
| 7,689,467 B1 | 3/2010 | Belanger et al. |
| 7,702,533 B2 | 4/2010 | Barnard et al. |
| 7,707,184 B1 | 4/2010 | Zhang et al. |
| 7,716,171 B2 | 5/2010 | Kryger |
| 7,734,578 B2 | 6/2010 | Prahlad et al. |
| 7,734,669 B2 | 6/2010 | Kottomtharayil et al. |
| 7,734,715 B2 | 6/2010 | Hyakutake et al. |
| 7,739,235 B2 | 6/2010 | Rousseau et al. |
| 7,747,579 B2 | 6/2010 | Prahlad et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,840,537 B2 | 11/2010 | Gokhale et al. |
| 7,844,577 B2 | 11/2010 | Becker et al. |
| 7,870,355 B2 | 1/2011 | Erofeev |
| 7,930,274 B2 | 4/2011 | Hwang et al. |
| 7,930,476 B1 | 4/2011 | Castelli et al. |
| 7,962,709 B2 | 6/2011 | Agrawal |
| 8,024,292 B2 * | 9/2011 | Thompson .......... G06F 11/1466 707/640 |
| 8,046,334 B2 | 10/2011 | Hwang et al. |
| 8,060,695 B1 | 11/2011 | Lee et al. |
| 8,156,086 B2 | 4/2012 | Lu et al. |
| 8,166,263 B2 | 4/2012 | Prahlad |
| 8,170,995 B2 | 5/2012 | Prahlad et al. |
| 8,190,565 B2 | 5/2012 | Prahlad et al. |
| 8,204,859 B2 | 6/2012 | Ngo |
| 8,205,049 B1 | 6/2012 | Armangau et al. |
| 8,219,524 B2 | 7/2012 | Gokhale |
| 8,229,954 B2 | 7/2012 | Kottomtharayil et al. |
| 8,230,195 B2 | 7/2012 | Amarendran et al. |
| 8,245,128 B1 | 8/2012 | Ahad et al. |
| 8,285,681 B2 | 10/2012 | Prahlad et al. |
| 8,307,177 B2 | 11/2012 | Prahlad et al. |
| 8,326,803 B1 | 12/2012 | Stringham |
| 8,346,727 B1 | 1/2013 | Chester et al. |
| 8,352,422 B2 | 1/2013 | Prahlad et al. |
| 8,364,652 B2 | 1/2013 | Vijayan et al. |
| 8,463,751 B2 | 6/2013 | Kottomtharayil |
| 8,489,656 B2 | 7/2013 | Erofeev |
| 8,510,271 B1 | 8/2013 | Tsaur et al. |
| 8,521,694 B1 | 8/2013 | Natanzon |
| 8,578,120 B2 | 11/2013 | Attarde et al. |
| 8,656,123 B2 | 2/2014 | Lee |
| 8,719,226 B1 | 5/2014 | Jiang et al. |
| 8,725,694 B2 | 5/2014 | Kottomtharayil |
| 8,789,208 B1 | 7/2014 | Sundaram et al. |
| 8,856,079 B1 | 10/2014 | Subramanian et al. |
| 8,868,494 B2 | 10/2014 | Agrawal |
| 8,930,497 B1 | 1/2015 | Holmes et al. |
| 8,954,446 B2 | 2/2015 | Holmes et al. |
| 9,002,785 B2 | 4/2015 | Prahlad et al. |
| 9,015,121 B1 | 4/2015 | Salamon et al. |
| 9,020,900 B2 | 4/2015 | Vijayan et al. |
| 9,098,495 B2 | 8/2015 | Gokhale |
| 9,128,901 B1 | 9/2015 | Nickurak et al. |
| 9,218,252 B1 | 12/2015 | Revur et al. |
| 9,239,687 B2 | 1/2016 | Vijayan et al. |
| 9,239,840 B1 | 1/2016 | Acharya |
| 9,251,198 B2 | 2/2016 | Mutalik et al. |
| 9,535,907 B1 | 1/2017 | Stringham |
| 9,619,172 B1 | 4/2017 | Natanzon et al. |
| 9,852,026 B2 | 12/2017 | Mitkar et al. |
| 9,886,346 B2 | 2/2018 | Kumarasamy et al. |
| 9,892,123 B2 | 2/2018 | Kottomtharayil et al. |
| 9,898,371 B2 | 2/2018 | Kumarasamy et al. |
| 9,921,920 B2 | 3/2018 | Nallathambi et al. |
| 9,928,002 B2 | 3/2018 | Kumarasamy et al. |
| 9,928,146 B2 | 3/2018 | Nallathambi et al. |
| 9,965,306 B1 | 5/2018 | Natanzon et al. |
| 9,996,428 B2 | 6/2018 | Nallathambi et al. |
| 10,042,716 B2 | 8/2018 | Nallathambi et al. |
| 10,044,803 B2 | 8/2018 | Nallathambi et al. |
| 10,223,365 B2 | 3/2019 | Kottomtharayil et al. |
| 10,228,962 B2 | 3/2019 | Dornemann et al. |
| 10,250,679 B1 | 4/2019 | Natanzon et al. |
| 2001/0027457 A1 | 10/2001 | Yee |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0042222 A1 | 11/2001 | Kedem et al. |
| 2001/0044807 A1 | 11/2001 | Kleiman et al. |
| 2001/0044834 A1 | 11/2001 | Bradshaw et al. |
| 2002/0002557 A1 | 1/2002 | Straube et al. |
| 2002/0004883 A1 | 1/2002 | Nguyen et al. |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0069324 A1 | 6/2002 | Gerasimov et al. |
| 2002/0073070 A1 | 6/2002 | Morita et al. |
| 2002/0083055 A1 | 6/2002 | Pachet et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0133511 A1 | 9/2002 | Hostetter et al. |
| 2002/0133512 A1 | 9/2002 | Milillo et al. |
| 2002/0143903 A1 | 10/2002 | Uratani et al. |
| 2002/0152381 A1 | 10/2002 | Kuriya et al. |
| 2002/0161753 A1 | 10/2002 | Inaba et al. |
| 2002/0174107 A1 | 11/2002 | Poulin |
| 2002/0174416 A1 | 11/2002 | Bates et al. |
| 2003/0018657 A1 | 1/2003 | Monday |
| 2003/0028736 A1 | 2/2003 | Berkowitz et al. |
| 2003/0061491 A1 | 3/2003 | Jaskiewicz et al. |
| 2003/0097296 A1 | 5/2003 | Putt |
| 2003/0131278 A1 | 7/2003 | Fujibayashi |
| 2003/0135783 A1 | 7/2003 | Martin et al. |
| 2003/0140070 A1 | 7/2003 | Kaczmarski et al. |
| 2003/0158834 A1 | 8/2003 | Sawdon et al. |
| 2003/0167380 A1 | 9/2003 | Green et al. |
| 2003/0177149 A1 | 9/2003 | Coombs |
| 2003/0177321 A1 | 9/2003 | Watanabe |

(56) References Cited

U.S. PATENT DOCUMENTS

| | | |
|---|---|---|
| 2003/0187847 A1 | 10/2003 | Lubbers et al. |
| 2003/0225800 A1 | 12/2003 | Kavuri |
| 2004/0002934 A1 | 1/2004 | Taulbee et al. |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0098425 A1 | 5/2004 | Wiss et al. |
| 2004/0107199 A1 | 6/2004 | Dairymple, III et al. |
| 2004/0117572 A1 | 6/2004 | Welsh et al. |
| 2004/0139128 A1 | 7/2004 | Becker et al. |
| 2004/0143642 A1 | 7/2004 | Beckmann et al. |
| 2004/0148376 A1 | 7/2004 | Rangan et al. |
| 2004/0193953 A1 | 9/2004 | Callahan et al. |
| 2004/0205206 A1 | 10/2004 | Naik et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267835 A1 | 12/2004 | Zwilling et al. |
| 2004/0267836 A1 | 12/2004 | Amangau et al. |
| 2005/0005070 A1 | 1/2005 | Lam |
| 2005/0027748 A1 | 2/2005 | Kisley |
| 2005/0027892 A1 | 2/2005 | McCabe et al. |
| 2005/0033800 A1 | 2/2005 | Kavuri et al. |
| 2005/0033878 A1 | 2/2005 | Pangal et al. |
| 2005/0060598 A1 | 3/2005 | Klotz et al. |
| 2005/0066118 A1 | 3/2005 | Perry et al. |
| 2005/0066222 A1 | 3/2005 | Rowan et al. |
| 2005/0066225 A1 | 3/2005 | Rowan et al. |
| 2005/0080928 A1 | 4/2005 | Beverly et al. |
| 2005/0086241 A1 | 4/2005 | Ram et al. |
| 2005/0108292 A1 | 5/2005 | Burton et al. |
| 2005/0138306 A1 | 6/2005 | Panchbudhe et al. |
| 2005/0144202 A1 | 6/2005 | Chen |
| 2005/0187982 A1 | 8/2005 | Sato |
| 2005/0188254 A1 | 8/2005 | Urabe et al. |
| 2005/0198083 A1 | 9/2005 | Saika et al. |
| 2005/0246510 A1 | 11/2005 | Retnamma et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0020616 A1 | 1/2006 | Hardy et al. |
| 2006/0034454 A1 | 2/2006 | Damgaard et al. |
| 2006/0047805 A1 | 3/2006 | Byrd et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0136771 A1 | 6/2006 | Watanabe |
| 2006/0224846 A1 | 10/2006 | Amarendran et al. |
| 2006/0242371 A1 | 10/2006 | Shono et al. |
| 2006/0242489 A1 | 10/2006 | Brockway et al. |
| 2007/0005915 A1 | 1/2007 | Thompson et al. |
| 2007/0006018 A1 | 1/2007 | Thompson et al. |
| 2007/0043956 A1 | 2/2007 | El Far et al. |
| 2007/0067263 A1 | 3/2007 | Husain et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0115738 A1 | 5/2007 | Emaru |
| 2007/0124347 A1 | 5/2007 | Vivian et al. |
| 2007/0124348 A1 | 5/2007 | Claborn et al. |
| 2007/0143756 A1 | 6/2007 | Gokhale |
| 2007/0174569 A1 | 7/2007 | Schnapp et al. |
| 2007/0179990 A1 | 8/2007 | Zimran et al. |
| 2007/0183224 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahlad et al. |
| 2007/0198602 A1 | 8/2007 | Ngo et al. |
| 2007/0244571 A1 | 10/2007 | Wilson et al. |
| 2007/0283111 A1 | 12/2007 | Berkowitz et al. |
| 2007/0288536 A1 | 12/2007 | Sen et al. |
| 2007/0288711 A1 | 12/2007 | Chen et al. |
| 2008/0016293 A1 | 1/2008 | Saika |
| 2008/0028009 A1 | 1/2008 | Ngo |
| 2008/0059515 A1 | 3/2008 | Fulton |
| 2008/0103916 A1 | 5/2008 | Camarador et al. |
| 2008/0183775 A1 | 7/2008 | Prahlad et al. |
| 2008/0209146 A1 | 8/2008 | Imazu et al. |
| 2008/0229037 A1 | 9/2008 | Bunte et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0244205 A1 | 10/2008 | Amano et al. |
| 2008/0306954 A1 | 12/2008 | Hornqvist |
| 2009/0044046 A1 | 2/2009 | Yamasaki |
| 2009/0070330 A1 | 3/2009 | Hwang et al. |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0216816 A1 | 8/2009 | Basler et al. |
| 2009/0319534 A1 | 12/2009 | Gokhale |
| 2009/0319582 A1 | 12/2009 | Simek et al. |
| 2009/0319585 A1 | 12/2009 | Gokhale |
| 2010/0005259 A1 | 1/2010 | Prahlad |
| 2010/0011178 A1 | 1/2010 | Feathergill et al. |
| 2010/0036931 A1 | 2/2010 | Certain et al. |
| 2010/0049753 A1 | 2/2010 | Prahlad et al. |
| 2010/0070726 A1 | 3/2010 | Ngo et al. |
| 2010/0094808 A1 | 4/2010 | Erofeev |
| 2010/0100529 A1 | 4/2010 | Erofeev |
| 2010/0122053 A1 | 5/2010 | Prahlad et al. |
| 2010/0131461 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2010/0228919 A1 | 9/2010 | Stabrawa et al. |
| 2010/0250735 A1 | 9/2010 | Andersen |
| 2010/0257142 A1 | 10/2010 | Murphy et al. |
| 2010/0287141 A1 | 11/2010 | Prahlad et al. |
| 2011/0047195 A1 | 2/2011 | Le et al. |
| 2011/0047340 A1 | 2/2011 | Olson et al. |
| 2011/0066599 A1 | 3/2011 | Prahlad et al. |
| 2011/0161299 A1 | 6/2011 | Prahlad et al. |
| 2011/0161300 A1 | 6/2011 | Hwang et al. |
| 2011/0196957 A1 | 8/2011 | Ayachitula et al. |
| 2011/0246416 A1 | 10/2011 | Prahlad et al. |
| 2011/0246429 A1 | 10/2011 | Prahlad et al. |
| 2011/0276594 A1 | 11/2011 | Chong et al. |
| 2011/0295804 A1 | 12/2011 | Erofeev |
| 2011/0295806 A1 | 12/2011 | Erofeev |
| 2012/0079221 A1 | 3/2012 | Sivasubramanian et al. |
| 2012/0084523 A1 | 4/2012 | Littlefield et al. |
| 2012/0131684 A1 | 5/2012 | Lynch |
| 2012/0150818 A1 | 6/2012 | Vijayan Retnamma et al. |
| 2012/0150826 A1 | 6/2012 | Vijayan Retnamma et al. |
| 2012/0179886 A1 | 7/2012 | Prahlad et al. |
| 2012/0317074 A1 | 12/2012 | Ngo |
| 2013/0006926 A1 | 1/2013 | Erofeev |
| 2013/0006938 A1 | 1/2013 | Prahlad et al. |
| 2013/0007183 A1 | 1/2013 | Sorenson et al. |
| 2013/0054910 A1 | 2/2013 | Vaghani et al. |
| 2013/0103650 A1 | 4/2013 | Natanzon et al. |
| 2013/0144881 A1 | 6/2013 | Sitsky et al. |
| 2013/0198311 A1 | 8/2013 | Tamir et al. |
| 2013/0218840 A1 | 8/2013 | Smith et al. |
| 2013/0238562 A1* | 9/2013 | Kumarasamy ...... G06F 9/45558 707/649 |
| 2013/0262800 A1 | 10/2013 | Goodman et al. |
| 2013/0282662 A1* | 10/2013 | Kumarasamy .......... G06F 11/14 707/649 |
| 2013/0282953 A1 | 10/2013 | Orme et al. |
| 2014/0201170 A1 | 7/2014 | Vivian et al. |
| 2014/0281317 A1 | 9/2014 | Garman et al. |
| 2016/0350391 A1 | 12/2016 | Vivian et al. |
| 2017/0168903 A1 | 6/2017 | Dornemann et al. |
| 2017/0185488 A1 | 6/2017 | Kumarasamy et al. |
| 2017/0192860 A1 | 7/2017 | Vijayan et al. |

(56) References Cited

U.S. PATENT DOCUMENTS

| | | | |
|---|---|---|---|
| 2017/0192861 | A1 | 7/2017 | Vijayan et al. |
| 2017/0192866 | A1 | 7/2017 | Vijayan et al. |
| 2017/0192867 | A1 | 7/2017 | Vijayan et al. |
| 2017/0192868 | A1 | 7/2017 | Vijayan et al. |
| 2017/0193003 | A1 | 7/2017 | Pawar et al. |
| 2017/0235647 | A1 | 8/2017 | Kilaru et al. |
| 2017/0242871 | A1 | 8/2017 | Kilaru et al. |
| 2017/0262520 | A1 | 9/2017 | Mitkar et al. |
| 2018/0232278 | A1 | 8/2018 | Kumarasamy et al. |
| 2018/0275880 | A1 | 9/2018 | Kumarasamy et al. |
| 2018/0314605 | A1 | 11/2018 | Nallathambi et al. |
| 2018/0324248 | A1 | 11/2018 | Nallathambi et al. |
| 2018/0373602 | A1 | 12/2018 | Nallathambi et al. |
| 2019/0146948 | A1 | 5/2019 | Kottomtharayil et al. |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 2000-347811 | 12/2000 |
| WO | WO 1993/003549 | 2/1993 |
| WO | WO 1995/013580 | 5/1995 |
| WO | WO 1998/39707 | 9/1998 |
| WO | WO 1999/012098 | 3/1999 |
| WO | WO 1999/014692 | 3/1999 |
| WO | WO 2002/095632 | 11/2002 |
| WO | WO 2003/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2007/075587 | 7/2007 |

OTHER PUBLICATIONS

Arneson, "Development of Omniserver; Mass Storage Systems," Control Data Corporation, 1990, pp. 88-93.
Arneson, "Mass Storage Archiving in Network Environments" IEEE, 1998, pp. 45-50.
Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, 9 pages, San Francisco, CA.
"Easy snapshot backup and recovery is here." Copyright date listed 2014. 6 pages.
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).
Gray (#1 of 2, pp. 646-655), Jim; Reuter, Andreas, Transaction Processing: Concepts and Techniques, Morgan Kaufmann Publisher, USA 1994, 1994,11 pages.
Gray (#2 of 2, pp. 604-609), Jim; Reuter Andreas, Transaction Processing Concepts and Techniques, Morgan Kaufmann Publisher, USA 1994, pp. 604-609.
Harrington, Lisa H., "The RFP Process: How to Hire a Third Party", Transportation & Distribution, Sep. 1988, vol. 39, Issue 9, in 5 pages.
http://en.wikipedia.org/wiki/Naive_Bayes_classifier, printed on Jun. 1, 2010, in 7 pages.
IntelliSnap—Advanced Snapshots—NAS iDataAgent. <http://documentation.commvault.com/commvault/v10/article?p=products/nas ndmp/snap . . . > Retrieved Oct. 24, 2014. 14 pages.
Jander, "Launching Storage-Area Net," Data Communications, US, McGraw Hill, NY, vol. 27, No. 4(Mar. 21, 1998), pp. 64-72.
Kashyap, et al., "Professional Services Automation: A knowledge Management approach using LSI and Domain specific Ontologies", FLAIRS-01 Proceedings, 2001, pp. 300-302.
Li et al., "iROW: An Efficient Live Snapshot System for Virtual Machine Disk", ICPADS 2012, Singapore, Dec. 17-19, 2012, pp. 376-383.
Lyon J., Design considerations in replicated database systems for disaster protection, COMPCON 1988, Feb. 29, 1988, pp. 428-430.
Microsoft Corporation, "Microsoft Exchange Server: Best Practices for Exchange Database Management," 1998, 26 pages.
Oltean, "VSS writers and inconsistent shadow copies", date listed Sep. 1, 2005, http://blogs.msdn.com/b/adioltean/archive/2005/08/31/458907.aspx., 2 pages.
Rosenblum et al., "The Design and Implementation of a Log-Structure File System," Operating Systems Review SIGOPS, vol. 25, No. 5, New York, US, pp. 1-14 (May 1991).
Simpana Intellisnap Snapshot Management Technology: Exponentially Accelerate Data Protection and Recovery. Copyright date listed 1999-2013. 2 pages.
Simpana Intellisnap Technology—Making Snaps Work. Copyright date listed 2014. 2 pages.
The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009, 58 pages.
Veritas Software Corporation, "Veritas Volume Manager 3.2, Administrator's Guide," Aug. 2001, 360 pages.
Waldspurger, Carl, et al., I/O Virtualization, Communications of the ACM, vol. 55, No. 1, Jan. 2012, pp. 66-72.
Wiesmann M, Database replication techniques: a three parameter classification, Oct. 16, 2000, pp. 206-215.
Examiner's Report for Australian Application No. 2003279847, dated Dec. 9, 2008, 4 pages.
European Examination Report; Application No. 06848901.2, dated Apr. 1, 2009, pp. 7.
Examiner's First Report; Application No. 2006331932 dated May 11, 2011 in 2 pages.
Canadian Office Action dated Dec. 10, 2009, Application No. CA2544063, 3 pages.
Canadian Office Action dated Dec. 29, 2010, Application No. CA2546304, 4 pages.
First Office Action in Indian Application No. 3359/DELNP/2006 dated Feb. 11, 2013, 2 pages.
Final Office Action for Japanese Application No. 2003531581, dated Mar. 24, 2009, 6 pages.
First Office Action for Japanese Application No. 2003531581, dated Jul. 8, 2008, 8 pages.
International Preliminary Report on Patentability, PCT Application No. PCT/US2009/066880, dated Jun. 23, 2011, in 9 pages.
International Search Report and Written Opinion dated Jan. 11, 2006, PCT/US2004/038455, 4 pages.
International Search Report and Written Opinion dated Mar. 25, 2010, PCT/US2009/066880, 11 pages.
International Search Report and Written Opinion dated Nov. 13, 2009, PCT/US2007/081681m, 8 pages.
International Search Report and Written Opinion issued in PCT Application No. PCT/US2011/030396, dated Jul. 18, 2011, in 20 pages.

(56) References Cited

OTHER PUBLICATIONS

International Search Report and Written Opinion issued in PCT Application No. PCT/US2011/38436, dated Sep. 21, 2011, in 18 pages.
International Search Report dated Dec. 28, 2009, PCT/US2004/038324, 2 pages.
International Search Report from International Application No. PCT/US2006/048273, dated May 15, 2007, 13 pages.

* cited by examiner

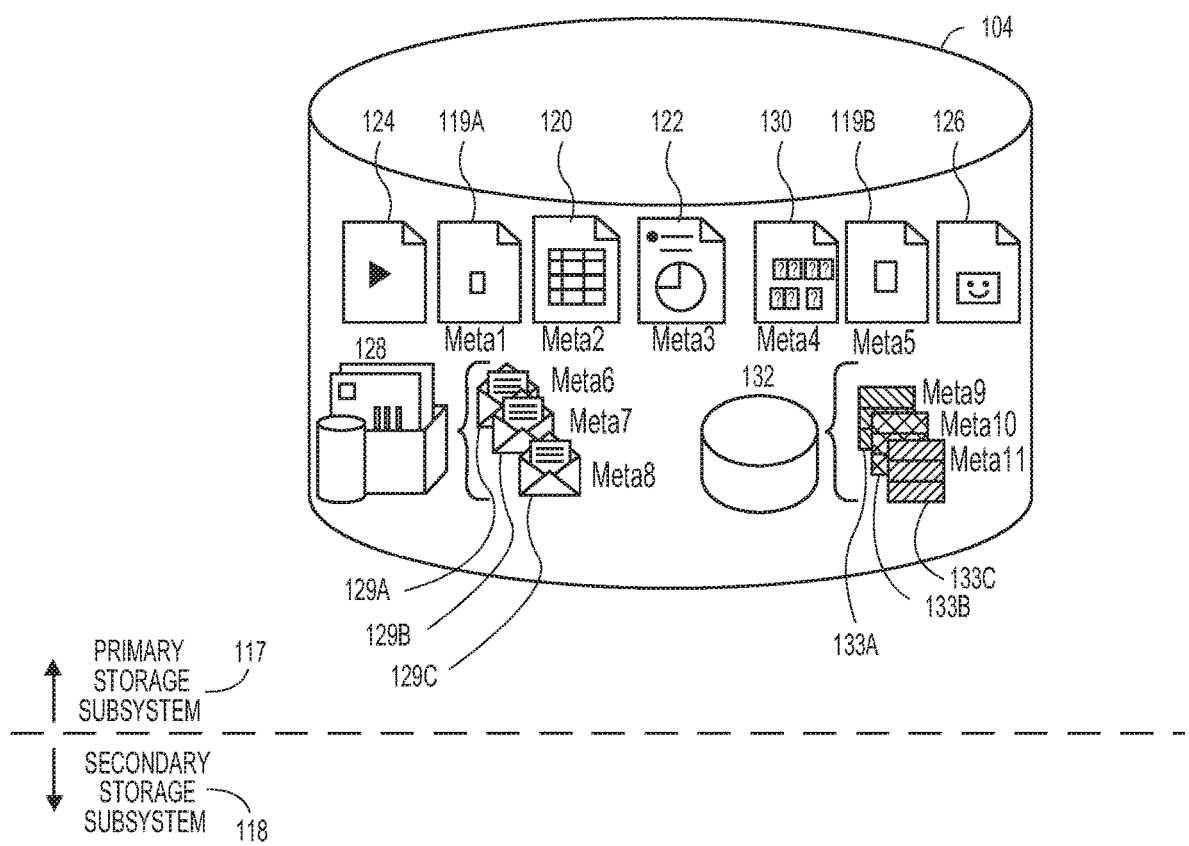
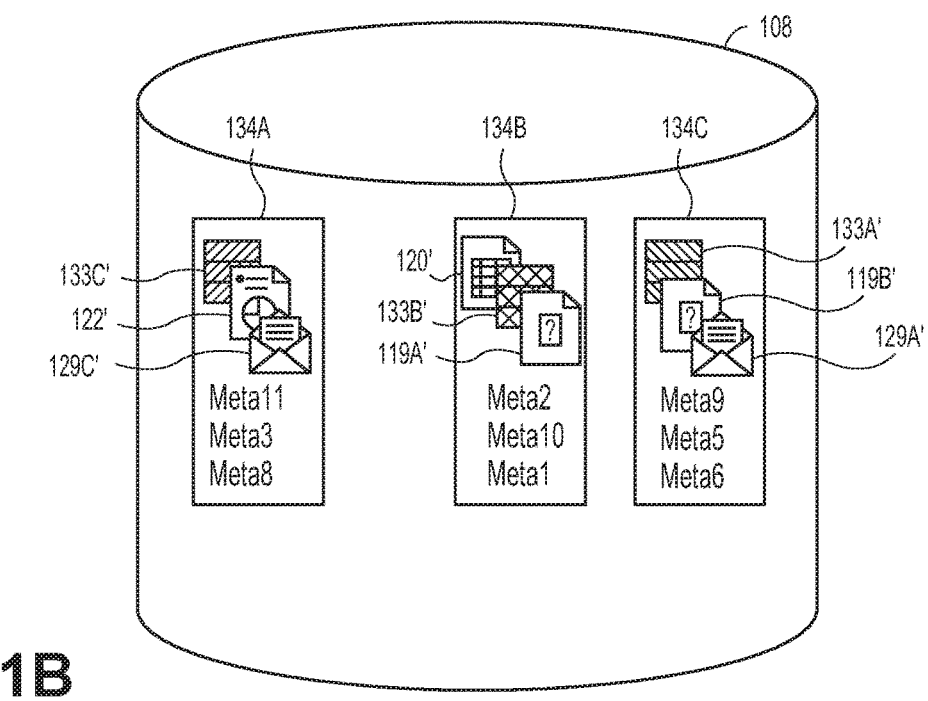
FIG. 1B

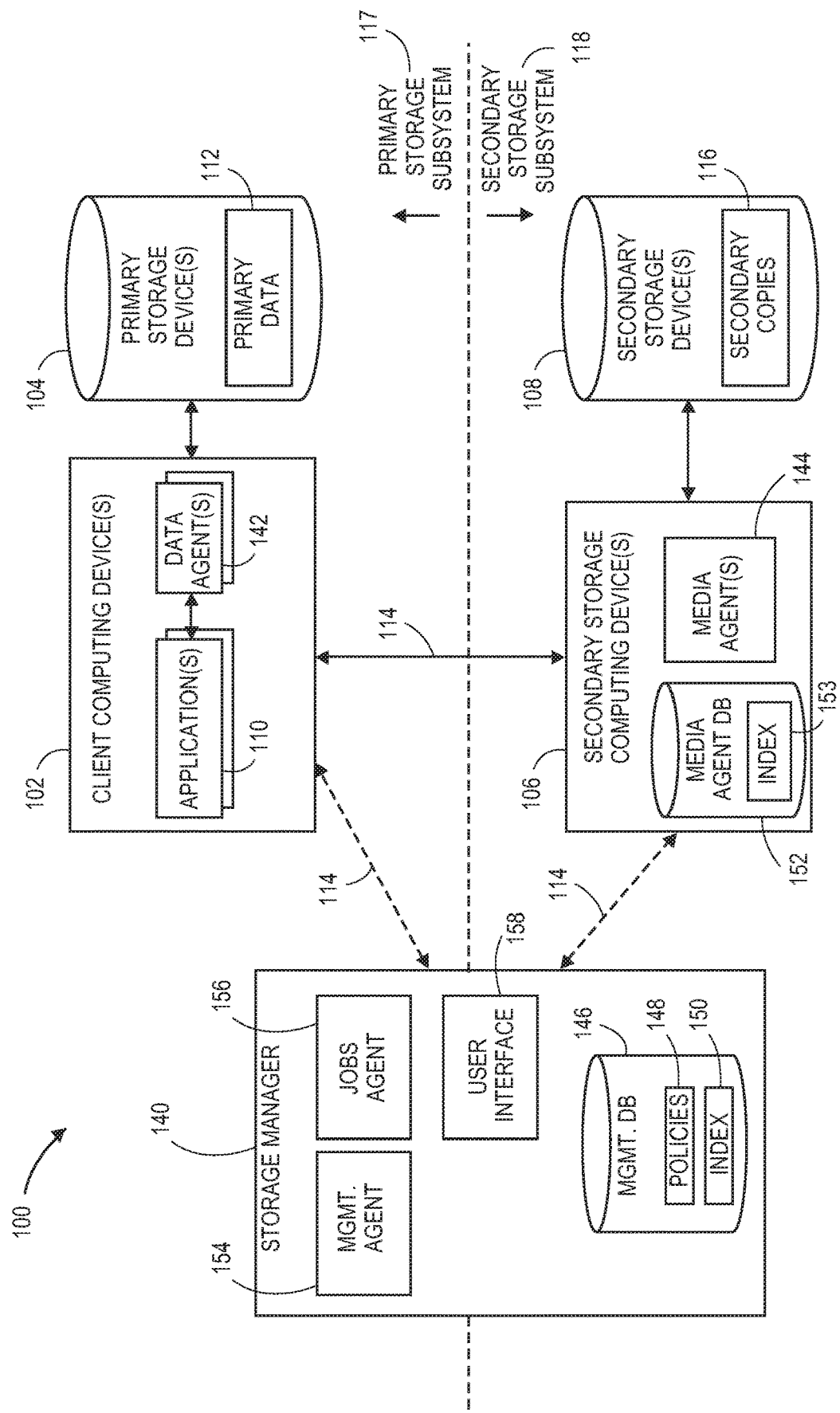

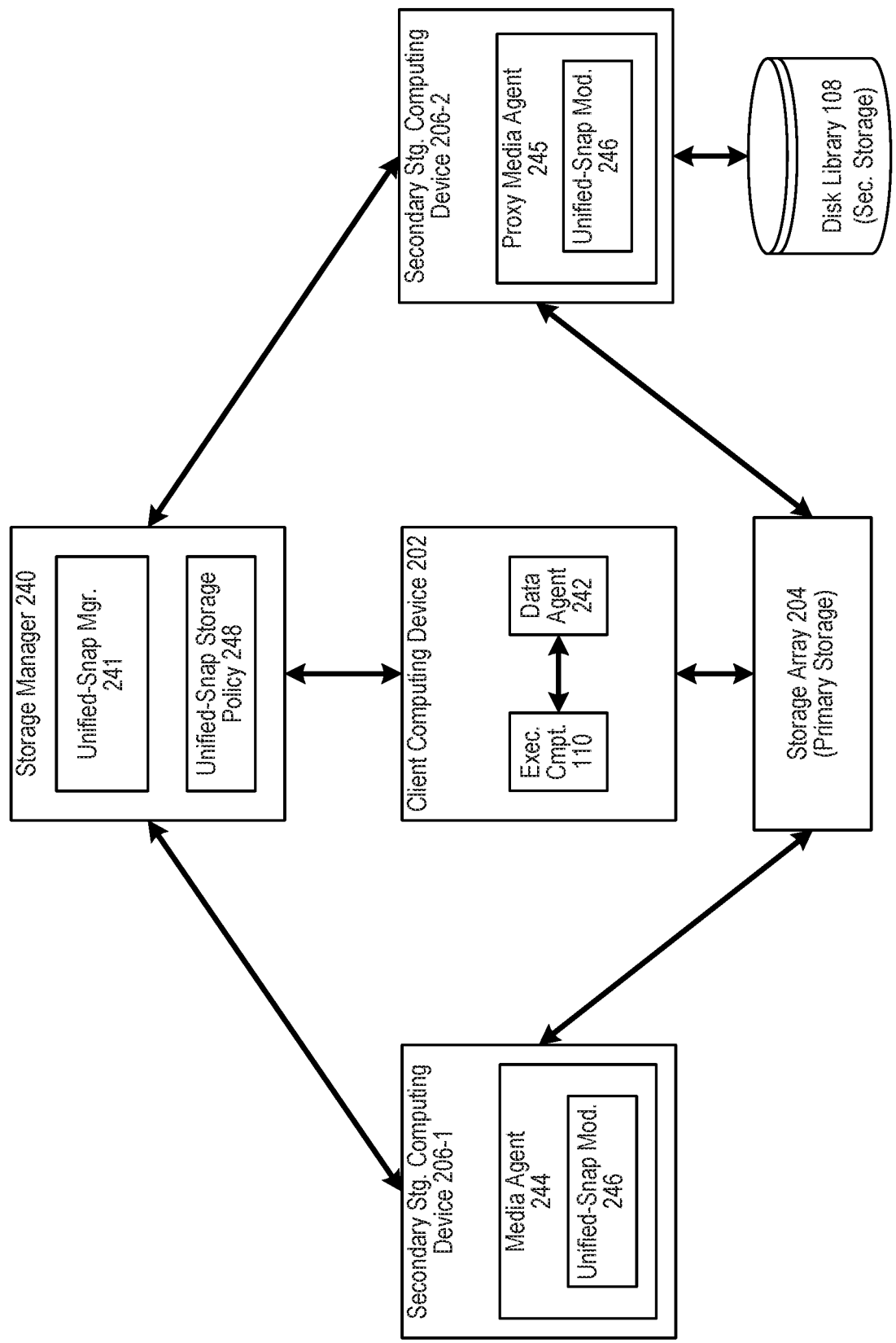
FIG. 2  System 200 For "One-Click" Unified-Snapshot Storage Management

UNIFIED SNAPSHOT STORAGE MANAGEMENT, USING AN ENHANCED STORAGE MANAGER AND ENHANCED MEDIA AGENTS

INCORPORATION BY REFERENCE TO ANY PRIORITY APPLICATIONS

This application is a Continuation of U.S. patent application Ser. No. 15/474,166 entitled "Unified Snapshot Storage Management, Using an Enhanced Storage Manager and Enhanced Media Agents" and filed on Mar. 30, 2017, which is a Continuation of U.S. Pat. No. 9,648,105 B2, filed on Nov. 14, 2014 with the title of "Unified Snapshot Storage Management, Using an Enhanced Storage Manager and Enhanced Media Agents." Any and all applications, if any, for which a foreign or domestic priority claim is identified in the Application Data Sheet of the present application are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by each of its employees, such as those used by an accounting department, marketing department, engineering department, and so forth.

Given the rapidly expanding amounts of data to be protected, companies also continue to seek innovative techniques for managing data growth and the costs associated with storing the data. For example, reducing the complexity of a storage management system and the expenses of maintaining it remains an ever-present need.

SUMMARY

Snapshot management is a key issue in storage management, because storage arrays have significant limits to the number of snapshots they may generate and store. Thus, even a well-designed storage management system with a balanced, distributed architecture may encounter the hard limits posed by storage arrays, which can only store and track so many snapshots, no matter whether the total storage capacity of the storage array has been reached. Moreover, too much snapshot activity may reduce the performance of the storage array relative to the production environment which is actively accessing (e.g., writing, reading) data in the storage array.

The present inventors devised an approach to managing snapshots that streamlines how and when snapshots are generated in a storage management system, such that fewer snapshots may be generated without diminishing the scope of data protection. A novel unified-snapshot storage policy may govern snapshots for any number of subclients. A unified-snapshot job based on the unified-snapshot storage policy enables the illustrative storage management system to automatically discover relevant components and generate at most one snapshot per target logical unit number ("LUN") in a storage array. Each target LUN, which designates a portion of storage in a storage array (e.g., a logical unit), may comprise data of any number of subclient and/or client components of the storage management system. Correspondingly, each snapshot likewise will comprise the subclients' and/or clients' data. Accordingly, one unified-snapshot job may yield a minimum but sufficient number of snapshots which collectively comprise data of all subclients associated with the governing unified-snapshot storage policy. An enhanced storage manager may manage the unified-snapshot jobs. One or more enhanced media agents and/or enhanced data agents may participate in the unified-snapshot jobs as well as in subsequent cataloguing and secondary copy operations relative to the snapshots.

Rather than configuring storage policies that are directed at and are launched on a subclient basis as in the prior art, the illustrative unified-snapshot storage policy operates at the system level to enable the system to automatically discover the relevant components for which snapshots are to be taken on a unified basis. This approach is more streamlined operationally and, by generating fewer snapshots, the approach is more efficient for the storage array(s). Thus, any combination of subclients, whether part of one client or many clients, may be represented in one per-LUN unified snapshot based on a given unified-snapshot storage policy. The illustrative embodiment provides both (i) increased granularity of choice, by allowing any combination of subclients to associate with a given unified-snapshot storage policy regardless of the identity of the subclients' respective clients; and (ii) substantially fewer snapshot operations and resultant snapshots, which more efficiently utilizes the system's storage arrays.

Accordingly, executing an illustrative unified-snapshot job based on a unified-snapshot storage policy generates at most one snapshot for each LUN, regardless of the number of clients that store primary data to the respective LUN. With hundreds or thousands of LUNs and hundreds or thousands of snapshot operations in a given storage management system, the illustrative unified-snapshot approach may produce significant savings. Since storage arrays typically have hard limits on the number of snapshots they may store, the present approach may significantly extend the utility and longevity of a storage array.

BRIEF DESCRIPTION OF THE DRAWINGS

FIG. 1B is a detailed view of a primary storage device, a secondary storage device, and some examples of primary data and secondary copy data.

FIG. 1C is a block diagram of an exemplary information management system including a storage manager, one or more data agents, and one or more media agents.

FIG. 2 is a block diagram illustrating some salient portions of a storage management system 200 for "one-click" unified-snapshot storage management, according to an illustrative embodiment of the present invention.

DETAILED DESCRIPTION

Systems and methods are disclosed for "one-click" unified-snapshot storage management. Examples of such systems and methods are described in further detail herein, in reference to FIGS. 2-5. Unified-snapshot storage management components and functionality may be configured and/or incorporated into information management systems such as those described herein in FIGS. 1A-1H.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Figure 1A:
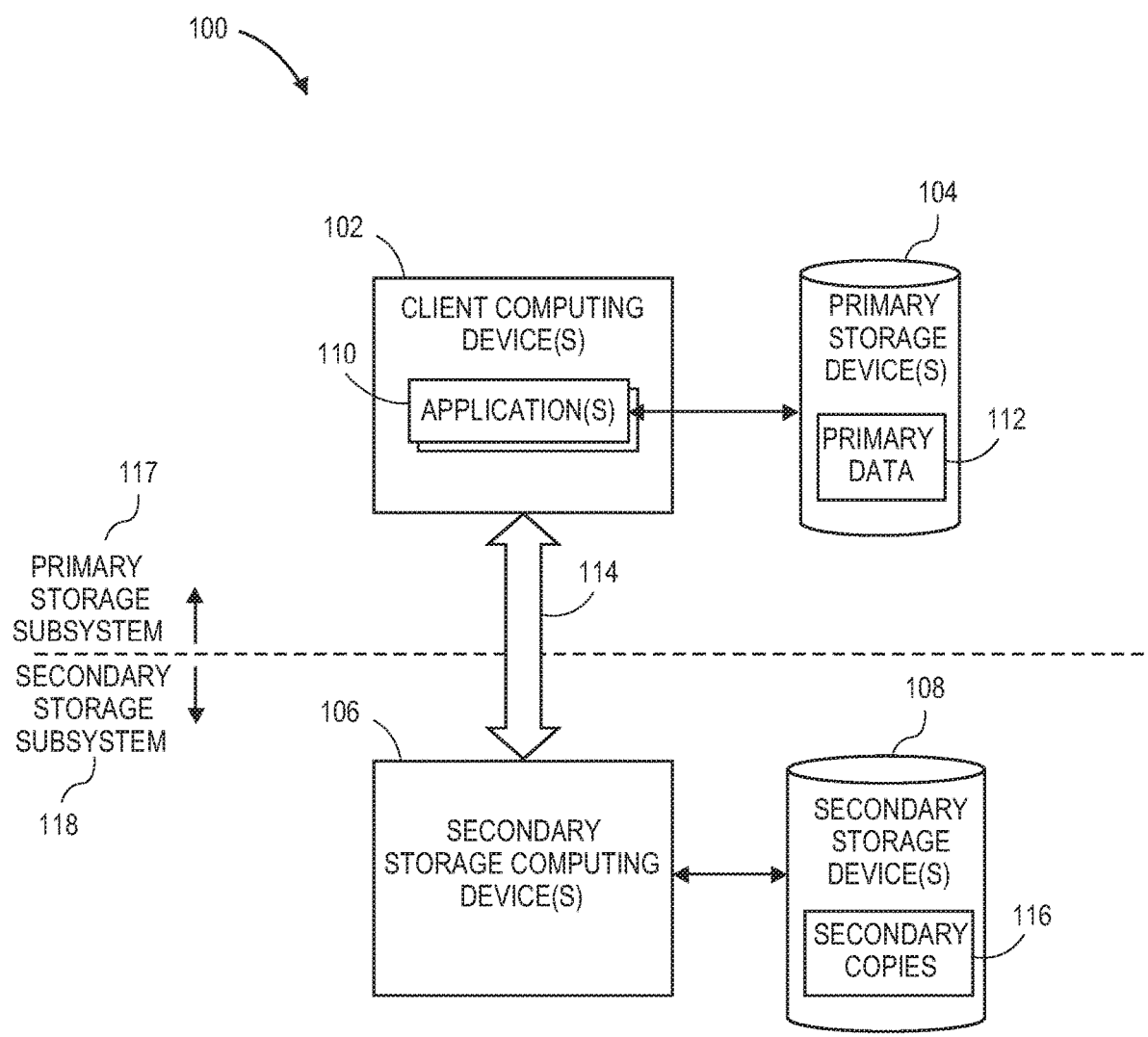
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata, which is generated and used by the various computing devices in information management system 100. The organization that employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,229,954, entitled "Managing Copies Of Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. Pub. No. 2006/0224846, entitled "System and Method to Support Single Instance Storage Operations";

U.S. Pat. Pub. No. 2009/0319534, entitled "Application-Aware and Remote Single Instance Data Management";

U.S. Pat. Pub. No. 2012/0150818, entitled "Client-Side Repository in a Networked Deduplicated Storage System";

U.S. Pat. Pub. No. 2012/0150826, entitled "Distributed Deduplicated Storage System"; and U.S. Pat. Pub. No. 2014/0201150, entitled "Single Snapshot for Multiple Agents."

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application (or other executable component) 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed and operating on it is generally referred to as a client computing device 102.

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system operating on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, a database server, a transaction server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed. The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

The client computing devices 102 and other components in information management system 100 can be connected to one another via one or more communication pathways 114. For example, a first communication pathway 114 may connect (or communicatively couple) client computing device 102 and secondary storage computing device 106; a second communication pathway 114 may connect storage manager 140 and client computing device 102; and a third communication pathway 114 may connect storage manager 140 and secondary storage computing device 106, etc. (see, e.g., FIG. 1A and FIG. 1C). The communication pathways 114 can include one or more networks or other connection types including one or more of the following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs. The underlying infrastructure of communication paths 114 may be wired and/or wireless, analog and/or digital, or any combination thereof; and the facilities used may be private, public, third-party provided, or any combination thereof, without limitation.

Primary Data and Exemplary Primary Storage Devices

Primary data 112 according to some embodiments is production data or other "live" data generated by the operating system and/or applications 110 operating on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources (e.g., primary storage device 104 may be a cloud-based resource).

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary storage devices 104 storing the primary data 112 may be relatively fast and/or expensive technology (e.g., a disk drive, a hard-disk array, solid state memory, etc.). In addition, primary data 112 may be highly changeable and/or may be intended for relatively short term retention (e.g., hours, days, or weeks).

According to some embodiments, the client computing device 102 can access primary data 112 from the primary storage device 104 by making conventional file system calls via the operating system. Primary data 112 may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects. For simplicity herein, it is to be understood that, unless expressly stated otherwise, any reference to primary data 112 generally also includes its associated metadata, but references to the metadata do not include the primary data.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

Primary storage device 104 may be dedicated or shared. In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR, and/or any other storage array.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications). Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged, lost, or otherwise corrupted. For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over one or more communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108 of secondary copy 116.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules operating on corresponding secondary storage computing devices 106 (or other appropriate computing devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122, and 129C (represented as 133C', 122', and 129C', respectively, and accompanied by the corresponding metadata Meta11, Meta3, and Meta8, respectively). Moreover, as indicated by the prime mark ('), a secondary copy object may store a representation of a primary data object and/or metadata differently than the original format, e.g., in a compressed, encrypted, deduplicated, or other modified format. Likewise, secondary data object 134b represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 119b, and 129A as 133A', 119B', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device, etc. without limitation.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization. For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application, which, in some embodiments operates in conjunction with one or more associated data structures, e.g., a dedicated database (e.g., management database 146). In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata. In general, storage manager 100 may be said to manage information management system 100, which includes managing the constituent components, e.g., data agents and media agents, etc.

As shown by the dashed arrowed lines 114 in FIG. 1C, the storage manager 140 may communicate with and/or control some or all elements of the information management system 100, such as the data agents 142 and media agents 144. Thus, in certain embodiments, control information originates from the storage manager 140 and status reporting is transmitted to storage manager 140 by the various managed components, whereas payload data and payload metadata is generally communicated between the data agents 142 and the media agents 144 (or otherwise between the client computing device(s) 102 and the secondary storage computing device(s) 106), e.g., at the direction of and under the management of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:

initiating execution of secondary copy operations;

managing secondary storage devices 108 and inventory/capacity of the same;

reporting, searching, and/or classification of data in the information management system 100;

allocating secondary storage devices 108 for secondary storage operations;

monitoring completion of and providing status reporting related to secondary storage operations;

tracking age information relating to secondary copies 116, secondary storage devices 108, and comparing the age information against retention guidelines;

tracking movement of data within the information management system 100;

tracking logical associations between components in the information management system 100;

protecting metadata associated with the information management system 100; and implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other people may be able to configure and initiate certain information management operations on an individual basis. But while this may be acceptable for some recovery operations or other relatively less frequent tasks, it is often not workable for implementing on-going organization-wide data protection and management. Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140 in some cases.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components. Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An "information management cell" (or "storage operation cell" or "cell") may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in e.g., U.S. Pat. Nos. 7,747,579 and 7,343,453, which are incorporated by reference herein.

Data Agents

As discussed, a variety of different types of applications 110 can operate on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences among applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations in information management system 100, generally as directed by storage manager 140. For instance, the data agent 142 may take part in performing data storage operations such as the copying, archiving, migrating, and/or replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, a specialized data agent 142 may be used for each data type to copy, archive, migrate, and restore the client computing device 102 data. For example, to backup, migrate, and/or restore all of the data on a Microsoft Exchange server, the client computing device 102 may use a Microsoft Exchange Mailbox data agent 142 to back up the Exchange mailboxes, a Microsoft Exchange Database data agent 142 to back up the Exchange databases, a Microsoft Exchange Public Folder data agent 142 to back up the Exchange Public Folders, and a Microsoft Windows File System data agent 142 to back up the file system of the client computing device 102. In such embodiments, these specialized data agents 142 may be treated as four separate data agents 142 even though they operate on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. In one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may operate on a dedicated secondary storage computing device 106 in some cases, while in other embodiments a plurality of media agents 144 operate on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may operate on secondary storage computing devices 106 having different housings or packages than the secondary storage devices 108. In one example, a media agent 144 operates on a first server computer and is in communication with a secondary storage device(s) 108 operating in a separate, rack-mounted RAID-based system.

Where the information management system 100 includes multiple media agents 144 (see, e.g., FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number ("LUN") and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 operates. In other cases, the media agent database 152 is stored remotely from the secondary storage computing device 106.

The media agent database 152 can include, among other things, an index 153 (see, e.g., FIG. 1C), which comprises information generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use without having to be first retrieved from the secondary storage device 108. In yet further embodiments, some or all of the information in index 153 may instead or additionally be stored along with the secondary copies of data in a secondary storage device 108. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may operate on computing devices that are physically separate from one another. This architecture can provide a number of benefits.

For instance, hardware and software design choices for each distributed component can be targeted to suit its particular function. The secondary computing devices 106 on which the media agents 144 operate can be tailored for interaction with associated secondary storage devices 108 and provide fast index cache operation, among other specific tasks. Similarly, the client computing device(s) 102 can be selected to effectively service the applications 110 thereon, in order to efficiently produce and store primary data 112.

Moreover, in some cases, one or more of the individual components in the information management system 100 can be distributed to multiple, separate computing devices. As one example, for large file systems where the amount of data stored in the management database 146 is relatively large, the database 146 may be migrated to or otherwise reside on a specialized database server (e.g., an SQL server) separate from a server that implements the other functions of the storage manager 140. This distributed configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss at the primary site. Or the database 146 can be replicated to another computing device within the same site, such as to a higher performance machine in the event that a storage manager host device can no longer service the needs of a growing information management system 100.

Figure 1D:
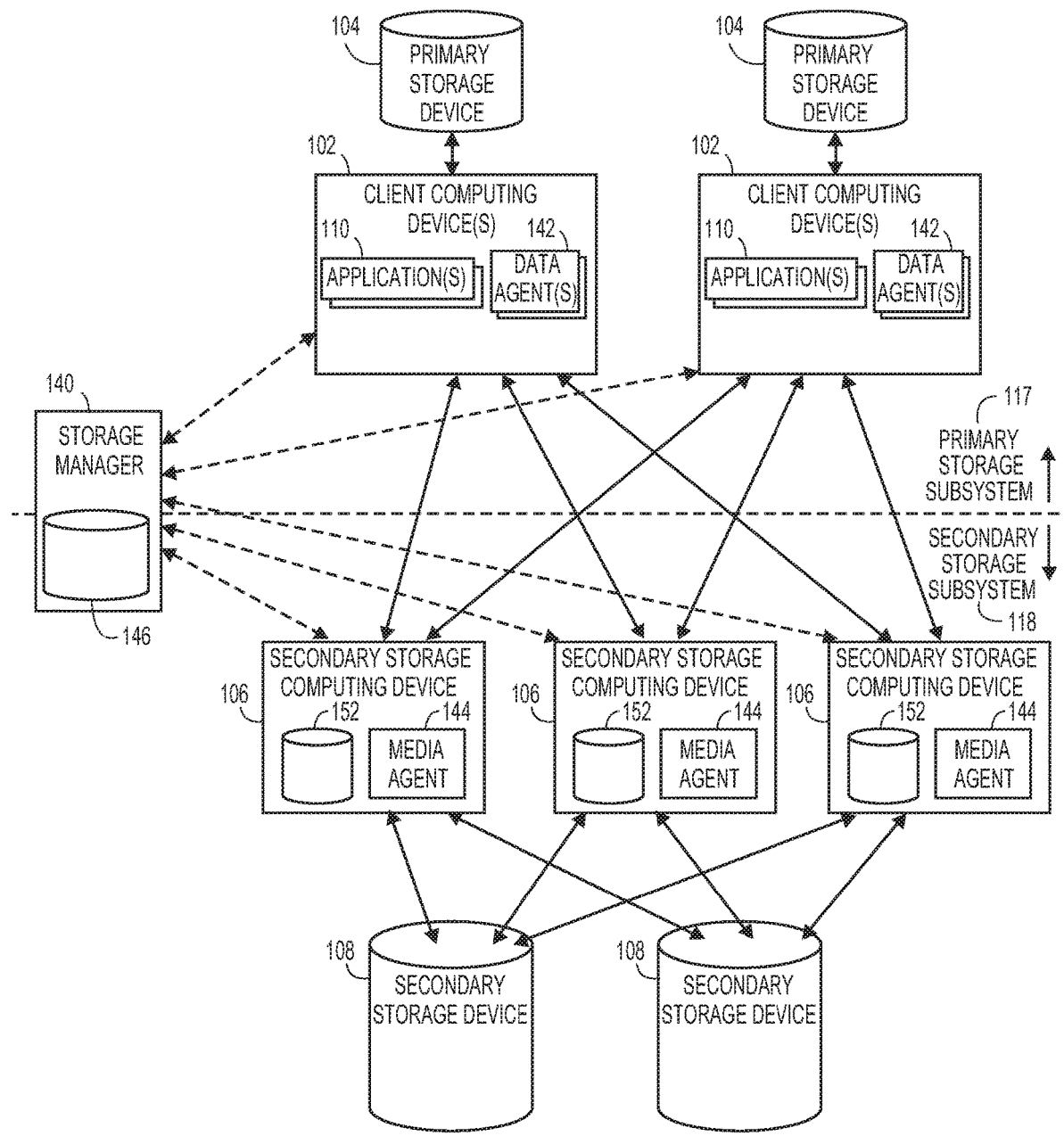
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments, one or more data agents 142 and the storage manager 140 operate on the same client computing device 102. In another embodiment, one or more data agents 142 and one or more media agents 144 operate on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing device, e.g., between two computers connected via a LAN, to a mobile client telecommunications device connected to a server via a WLAN, to any manner of client computing device coupled to a cloud storage target, etc., without limitation.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, a synthetic full backup does not actually transfer data from a client computer to the backup media, because it operates as a backup consolidator. A synthetic full backup extracts the index data of each participating subclient. Using this index data and the previously backed up user data images, it builds new full backup images, one for each subclient. The new backup images consolidate the index and user data stored in the related incremental, differential, and previous full backups, in some embodiments creating an archive file at the subclient level.

Any of the above types of backup operations can be at the volume-level, file-level, or block-level. Volume level backup operations generally involve the copying of a data volume (e.g., a logical disk or partition or logical unit number) as a whole. In a file-level backup, the information management system 100 may generally track changes to individual files, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

For example, in some embodiments, a reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within information management system 100.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the corresponding primary data 112 or a portion thereof is deleted when creating the archive copy. Thus, archiving can serve the purpose of freeing up space in the primary storage device(s) 104 and easing the demand on computational resources on client computing device 102. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management. In many storage array technologies a hardware snapshot is taken by the storage array at the level of a logical unit number ("LUN"), which may comprise all or part of a volume configured on the client computing device.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories are modified later on. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of non-primary data. For instance, some or all of the above-described secondary storage operations can involve deduplication in some fashion. New data is read, broken down into portions (e.g., sub-file level blocks, files, etc.) of a selected granularity, compared with blocks that are already in secondary storage, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side and/or source-side of an operation can be cloud-based storage devices. Thus, the target-side and/or source-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source is replaced by a logical reference pointer or stub. The reference pointer or stub can be stored in the primary storage device 104 (or other source storage device, such as a secondary storage device 108) to replace the deleted source data and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original native application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the primary data 112 and/or secondary copies 116. The content indexing can be used to identify files or other data objects having pre-defined content (e.g., user-defined keywords or phrases, other keywords/ phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

One or more components can be configured to scan data and/or associated metadata for classification purposes to populate a database (or other data structure) of information, which can be referred to as a "data classification database" or a "metabase". Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components, e.g., client computing devices 102 and/or media agents 144. In some embodiments, a data classification database (metabase) may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100. The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like. As an example, a storage manager 140 or other component in the information management system 100 may analyze traffic patterns and suggest and/or automatically route data via a particular route to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of storage operation cells in a hierarchy, such as the status of jobs, system components, system resources, and other items, by communicating with storage managers 140 (or other components) in the respective storage operation cells. Moreover, the master storage manager 140 may track the status of its associated storage operation cells and information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) an action to mitigate or otherwise address the risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priority values or "weights" to certain data and/or applications, corresponding to the relative importance. The level of compliance of storage operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about system elements to determine the cost of storage and/or the availability of particular data in the system. Exemplary information generated could include how fast a particular department is using up available storage space, how long data would take to recover over a particular system pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console (not shown). The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., communication pathways, etc.), and other information. The user may also drill down or use other means to obtain more detailed information regarding a particular component, job, or the like. Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy and/or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination (see, e.g., FIG. 1E).

As an illustrative example, data associated with a storage policy can be logically organized into groups. In some cases, these logical groupings can be referred to as "subclients". A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

Another type of information management policy 148 is a scheduling policy, which specifies when and how often to perform operations. Scheduling parameters may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a subclient), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective subclients.

When adding a new client computing device 102, administrators can manually configure information management policies 148 and/or other settings, e.g., via the user interface 158. However, this can be an involved process resulting in delays, and it may be desirable to begin data protection operations quickly, without awaiting human intervention. Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible, including one or more audit (or security) policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a provisioning policy. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of copy 116 (e.g., type of secondary copy) and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
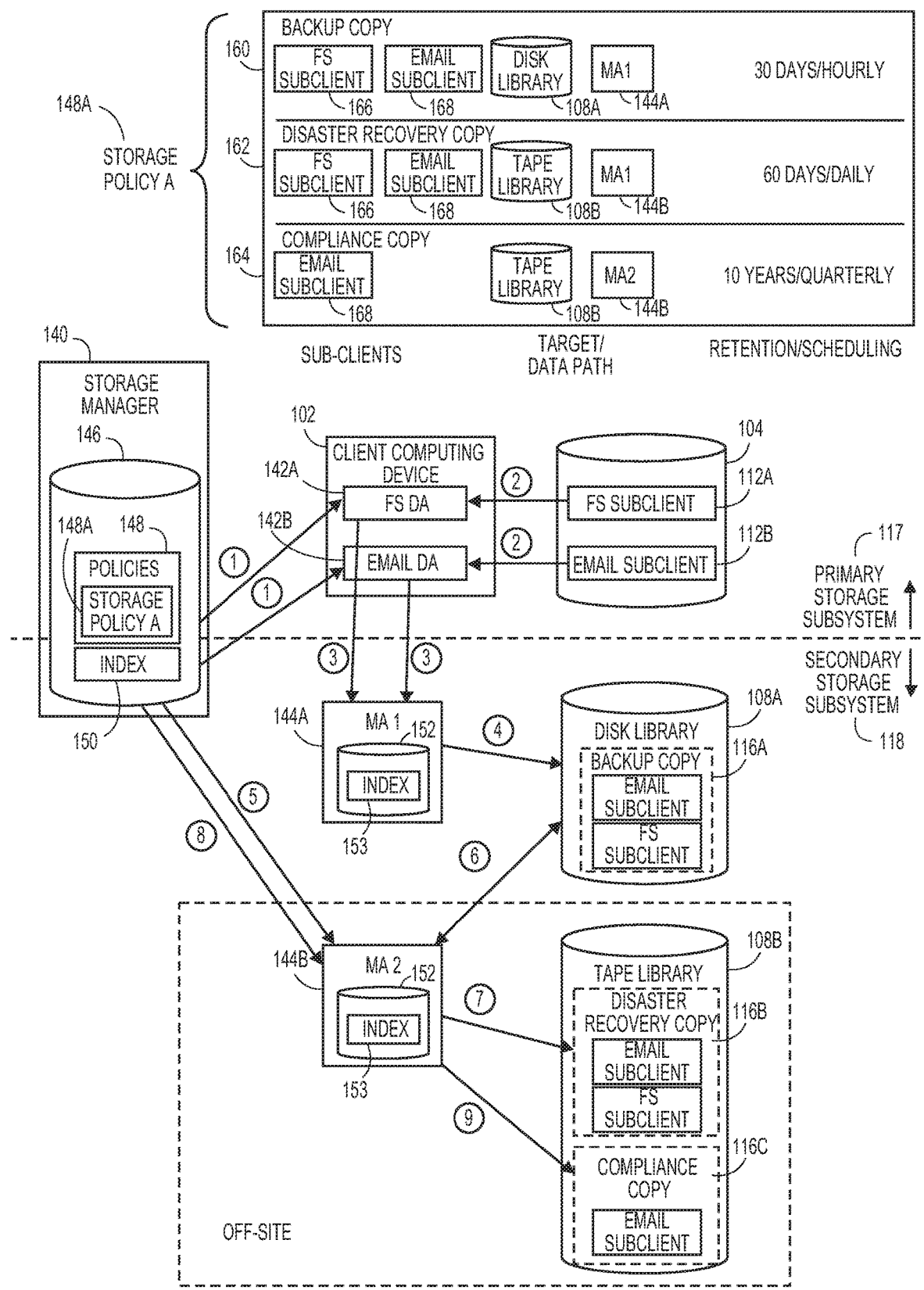
FIG. 1E illustrates certain secondary copy operations according to an exemplary storage policy.

FIG. 1E includes a data flow diagram depicting performance of storage operations by an embodiment of an information management system 100, according to an exemplary storage policy 148A. The information management system 100 includes a storage manger 140, a client computing device 102 having a file system data agent 142A and an email data agent 142B operating thereon, a primary storage device 104, two media agents 144A, 144B, and two secondary storage devices 108A, 108B: a disk library 108A and a tape library 108B. As shown, the primary storage device 104 includes primary data 112A, which is associated with a logical grouping of data associated with a file system, and primary data 112B, which is associated with a logical grouping of data associated with email. Although for simplicity the logical grouping of data associated with the file system is referred to as a file system subclient, and the logical grouping of data associated with the email is referred to as an email subclient, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system subclient and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail subclient, on the other hand, and its associated primary data 112B, include data generated by an e-mail application operating on the client computing device 102, and can include mailbox information, folder information, emails, attachments, associated database information, and the like. As described above, the subclients can be logical containers, and the data included in the corresponding primary data 112A, 112B may or may not be stored contiguously.

The exemplary storage policy 148A includes backup copy preferences (or rule set) 160, disaster recovery copy preferences rule set 162, and compliance copy preferences or rule set 164. The backup copy rule set 160 specifies that it is associated with a file system subclient 166 and an email subclient 168. Each of these subclients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two subclients 166, 168. However, the disaster recovery copy rule set 162 is associated with the tape library 108B, unlike the backup copy rule set 160. Moreover, the disaster recovery copy rule set 162 specifies that a different media agent, namely 144B, will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other catastrophic data loss that would affect the backup copy 116A maintained on the disk library 108A.

The compliance copy rule set 164 is only associated with the email subclient 168, and not the file system subclient 166. Compliance copies generated according to the compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 (i.e., to both data agent 142A and data agent 142B) to begin the backup operation.

At step 2, the file system data agent 142A and the email data agent 142B operating on the client computing device 102 respond to the instructions received from the storage manager 140 by accessing and processing the primary data 112A, 112B involved in the copy operation, which can be found in primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A. After the 30 day retention period expires, the storage manager 140 instructs the media agent 144A to delete the backup copy 116A from the disk library 108A. Indexes 150 and/or 153 are updated accordingly.

At step 5, the storage manager 140 initiates the creation of a disaster recovery copy 116B according to the disaster recovery copy rule set 162.

At step 6, illustratively based on the instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days; indexes are updated accordingly when/after each information management operation is executed/completed.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email subclient or using the backup copy 116A from the disk library 108A as source data. As specified, in the illustrated example, compliance copies 116C are created quarterly, and are deleted after ten years, and indexes are kept up-to-date accordingly.

While not shown in FIG. 1E, at some later point in time, a restore operation can be initiated involving one or more of the secondary copies 116A, 1166, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the management database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization and information management system.

A classification policy defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files. The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

Figure 1F:
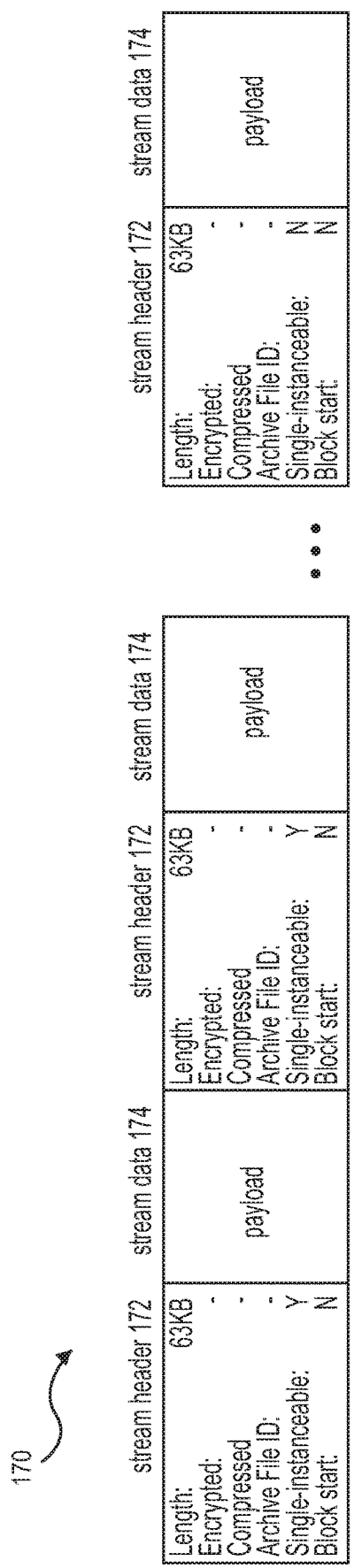
FIGS. 1F-1H are block diagrams illustrating suitable data structures that may be employed by the information management system.
Figure 1G:
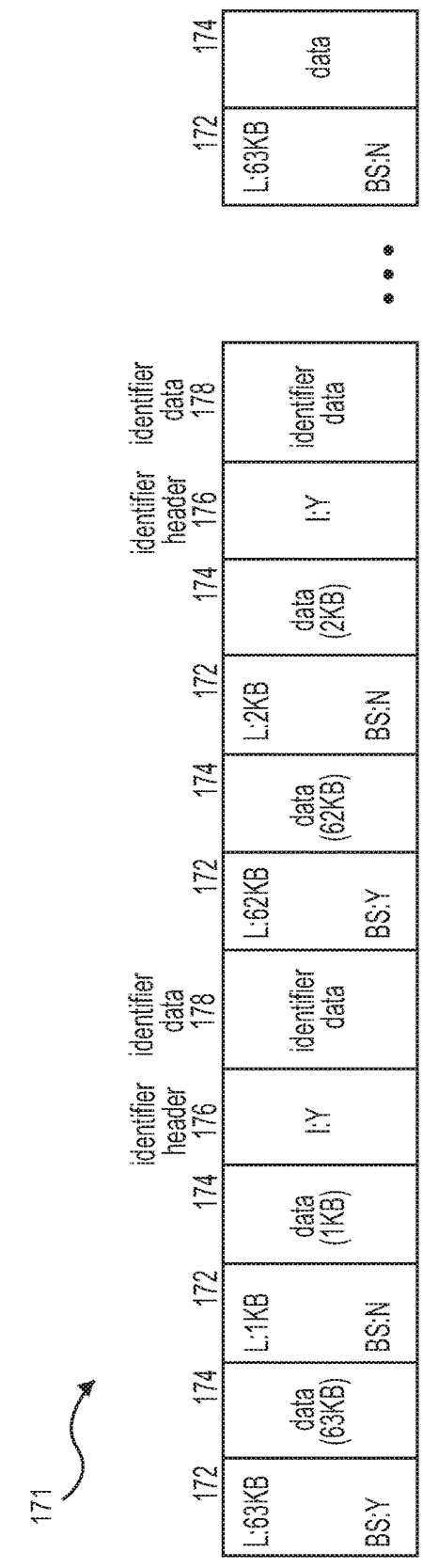

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
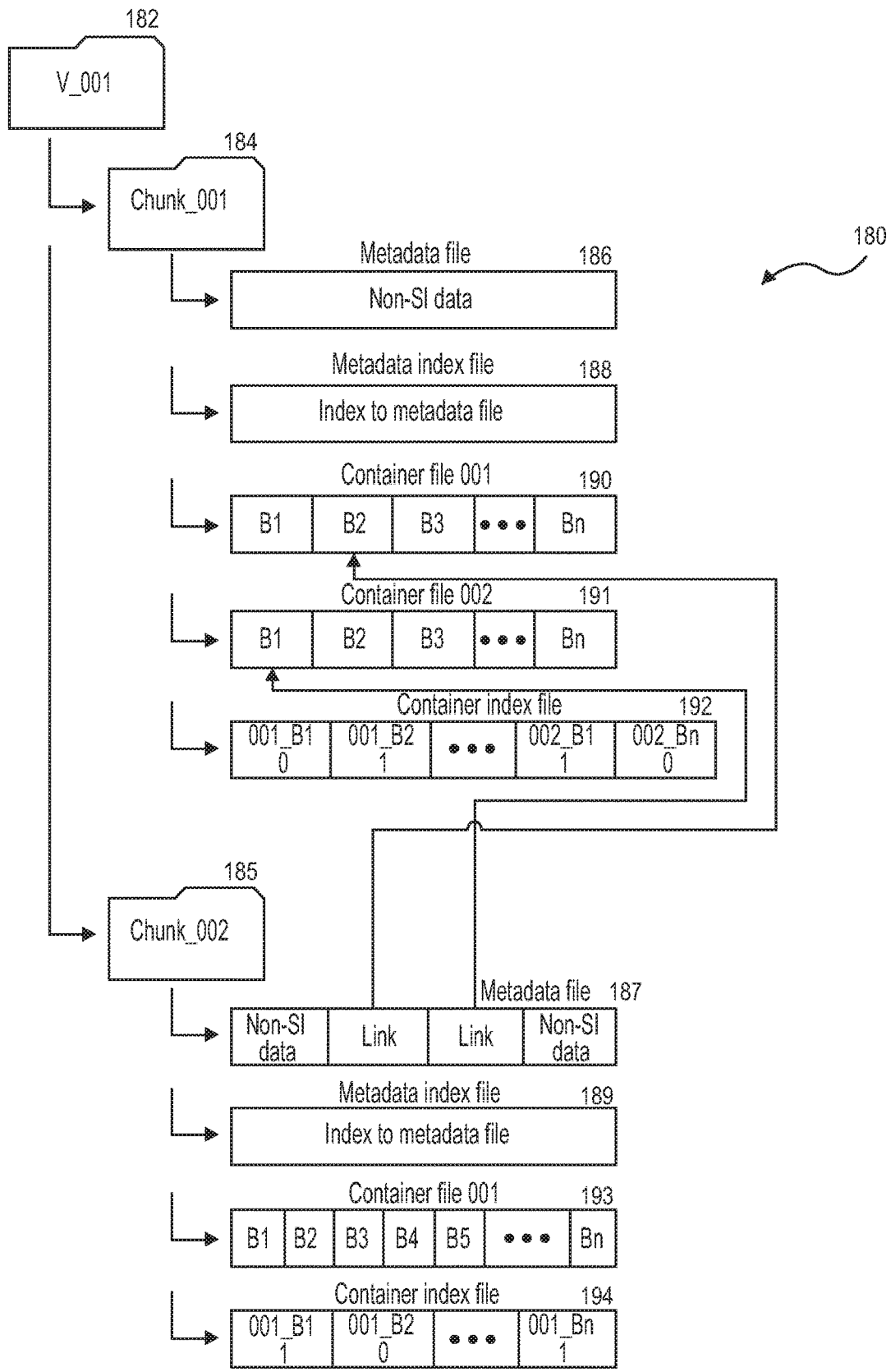

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 operates supports sparse files, then when the media agent 144 creates container files 190/191/193, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Unified Snapshot Storage Management, Using an Enhanced Storage Manager and Enhanced Media Agents Snapshot management is a key issue in storage management, because storage arrays have significant limits to the number of snapshots they may generate and store. Thus, even a well-designed storage management system with a balanced, distributed architecture may face the hard limits posed by storage arrays, which can only store and track so many snapshots, no matter whether the storage capacity of the array has been reached, e.g., 64 snapshots, 512 snapshots, etc. Moreover, too much snapshot activity may reduce the performance of the storage array relative to the production environment. Thus, streamlining how and when snapshots are generated in a storage array is desirable. An illustrative system that addresses this need is described in FIG. 2 and subsequent figures herein.

FIG. 2 is a block diagram illustrating some salient portions of a storage management system 200 for "one-click" unified-snapshot storage management, according to an illustrative embodiment of the present invention. Storage management system 200 is an enhanced embodiment of an information management system. The designation "one-click" refers to the present unified system-level approach that drives how and when snapshots are generated according to the illustrative embodiment.

Storage management system 200 may comprise: one or more secondary storage devices, such as disk library 108; one or more client computing devices 202, each one comprising a respective executable component 110 and a respective associated data agent 242; one or more storage arrays 204 for primary storage; one or more secondary storage computing devices 206 (e.g., 206-1, 206-2), each one comprising a media agent (e.g., 244, 245) each media agent comprising a unified-snapshot module 246; storage manager 240 comprising unified-snapshot manager module 241 and unified-snapshot storage policy 248. The components of system 200 may be interconnected as shown. The physical communications infrastructure required to support these logical connections is well known in the art, and may be any suitable electronic communications infrastructure, such as that described in regard to communication pathways 114 above. System 200 may comprise any number of these enumerated components, and may further comprise other components described in earlier figures, without limitation. Component 108 was described in more detail above.

Component 110 may be any executable component that may generate primary data, such as an operating system, a file system, an application and/or a virtual machine. For purposes of the illustrative embodiment, primary data (e.g., 112) may be stored to storage array 204. The executable component is installed and executes on client computing device 202. The primary data accessed (e.g., read operations, write operations) and/or generated by component 110 is illustratively stored in storage array 204, e.g., in LUN(s) hosted by storage array(s) 204. Each component 110 may have an associated data agent 242 that co-resides and executes on the same client computing device 202.

Client computing device 202 is analogous to client computing device 102 described in detail above, and further comprises added features and/or functionality for operating within system 200 according to the illustrative embodiment, e.g., comprising data agent 242.

Storage array 204 is a data storage device that is well known in the art (or may be a network of storage devices in some alternative embodiments) and is analogous to the storage arrays described above. Storage array 204 is generally used for storing primary data (e.g., 112) generated by client computing devices 202. Stored data on storage array 204 may be organized into portions or logical units designated by respective logical unit numbers ("LUNs") which are mapped to volume(s) on the corresponding computing device (e.g., client computing device 202, secondary storage computing device 206). A volume configured on a computing device 202/206 may map to one or more LUNs, on one or more storage arrays 204 as is well known in the art. A given LUN also may comprise data of one or more volumes that are configured on one or more computing devices 202/206, as is well known in the art. System 200 may comprise any number of storage arrays 204 provided by any number of manufacturers/vendors. Any given storage array 204 may store data from one or more client computing devices 202.

Storage array 204 also may generate and store snapshots ("hardware snapshots"). In general, storage array 204 generates snapshots at the LUN level, i.e., generates one or more hardware snapshots of a given LUN, as is well known in the art. Snapshots also may be mounted to computing devices, e.g., for restoring data or for executing secondary copy operations.

Secondary storage computing device 206 (e.g., 206-1, 206-2) is analogous to secondary storage computing device 106 described above, and may comprise additional features and/or functionality for operating within system 200 according to the illustrative embodiment, e.g., comprising an enhanced media agent equipped with unified-snapshot module 246. A secondary storage computing device 206 may be associated with one or more storage devices, such as storage array 204, disk library 108, etc.

Storage manager 240 is analogous to storage manager 140 described in detail above, and additionally comprises features and/or functionality for operating within system 200 according to the illustrative embodiment, e.g., comprising unified-snapshot manager module 241 and unified-snapshot storage policy 248. Storage manager manages storage management system 200. According to the illustrative embodiment, storage manager 240 also manages unified-snapshot jobs based on unified-snapshot storage policy(ies) 248. Managing a unified-snapshot job may comprise communicating and/or interoperating with a media agent component (e.g., 244, 245), with one or more storage arrays 204, with one or more data agents 242, and also comprises job tracking and monitoring as well as collecting and storing job results. Storage manager 240 also comprises and/or is associated with a management database (see, e.g., management database 146), that may store unified-snapshot storage policy 248 as well as other data/metadata relating to unified-snapshot jobs in system 200.

Data agent 242 is analogous to data agent 142 described in detail above, and additionally may comprise features and/or functionality for operating in system 200 according to the illustrative embodiment, e.g., additional messages set(s) to/from media agent 244/245 and/or storage manager 240.

Media agents 244 and 245 are analogous to media agent 144, and additionally comprise features and/or functionality for operating in system 200 according to the illustrative embodiment, e.g., comprising unified-snapshot module 246. Media agent 244 may participate in the unified-snapshot job, which may include discovering which LUNs to snap and instructing the respective storage array to generate and store the respective snapshot(s). Media agent 245 may participate in storage management operations after the unified-snapshot job has completed, such as executing deferred cataloguing of the snapshots generated during the unified-snapshot job, and further may participate in secondary copy operations wherein the snapshot(s) are copies to secondary storage, such as to disk library 108. In some alternative embodiments, the same media agent component may perform all these functions. In some alternative embodiments, media agent 244 may reside and execute on client computing device 202, alongside data agent 242. Any combination of these media agent scenarios is also possible.

Unified-snapshot manager module 241 is a functional component of storage manager 240, and may be implemented as executable software and/or firmware, which executes on the underlying computing device that hosts storage manager 240. When it executes according to the illustrative embodiment, module 241 may perform one or more of the following functions, without limitation:

Configuring any number of distinct unified-snapshot storage policies 248, e.g., via script, via user interface, etc.;

Storing unified-snapshot storage policy(ies) 248, e.g., to a management database such as 146;

Associating one or more subclients of system 200 with an appropriate unified-snapshot storage policy 248, and storing the respective association(s), e.g., to a management database such as 146;

Managing the execution of a unified-snapshot job based on unified-snapshot storage policy 248;

Discovering clients of system 200 that are snapshot-enabled;

Discovering subclient(s) of the snapshot-enabled clients that are snapshot enabled and are associated with unified-snapshot storage policy 248, i.e., discover the target subclients for a given unified-snapshot job;

For the discovered target subclients, query media agents 244/245 and/or data agents 242 to identify the subclient data to be protected in the unified-snapshot job;

Instructing media agents 244/245 to go ahead with snapshot operations;

Managing and participating in cataloguing of snapshots generated during the unified-snapshot job, which may include storing catalogue data/metadata to the management database, e.g., 146;

Managing one or more secondary copy operations based on the catalogued snapshots, e.g., copying a subclient's snapshotted data to secondary storage such as to disk library 108.

The enumerated functionality above is presented without limitation, and it will be understood by those having ordinary skill in the art, after reading the present disclosure, that substantial additional functionality is enabled by the architecture of system 200, according to the exemplary embodiment and other alternative embodiments. Unified-snapshot manager module 241 is shown herein as a distinct component to ease understanding of the present disclosure, however, alternative embodiments are also possible within the scope of the present invention. Module 241 may be embodied as a unified module within storage manager 240, layered on existing storage manager code, or may be a logical construct whose functionality is distributed through one or more other functional modules of the storage manager, such as management agent 154 and/or jobs agent 156—and in any combination thereof. In some alternative embodiments, module 241 may execute on another computing component that is physically distinct from storage manager 240, such as on a dedicated server that operates in conjunction with storage manager 240, but which may or may not be a logical component of storage manager 240.

Unified-snapshot module 246 is a functional component of media agent 244/245, and may be implemented as executable software and/or firmware, which executes on the underlying computing device that hosts the media agent, e.g., 206-1, 206-2, etc. When it executes according to the illustrative embodiment, module 241 may perform one or more of the following functions, without limitation:

Identifying each discovered subclient's data to be protected in the unified-snapshot job (e.g., mountpaths, database instance files, virtual machine files, etc.);

Discovering the LUNs that store identified subclient data, and further discovering the respective storage array 204 hosting the LUN(s), which may be referred to herein as "target LUNs";

Instructing each hosting array 204 that hosts one or more target LUNs to take a snapshot ("hardware snapshot") of each target LUN (e.g., S1, S2, etc. in FIG. 3) and store the snapshot on the storage array;

Receiving responsive snapshot reports from the hosting storage arrays 204 (e.g., 204-A, 204-B in FIG. 3), which may provide the media agent with snapshot ID, LUN association, snapshot location, and other identifying and/or location information so that the snapshot may be later located by the media agent;

Participating in cataloguing of the snapshots generated during the unified-snapshot job, which may include storing catalogue data/metadata to a local index, e.g., 153, and/or transmitting to storage manager 240;

Participating in one or more secondary copy operations based on the catalogued snapshots, e.g., copying a subclient's snapshotted data from storage array 204 to secondary storage such as to disk library 108, and performing appropriate indexing.

The enumerated functionality above is presented without limitation, and it will be understood by those having ordinary skill in the art, after reading the present disclosure, that substantial additional functionality is enabled by the architecture of system 200, according to the exemplary embodiment and other alternative embodiments. Unified-snapshot module 246 is shown herein as a distinct component to ease understanding of the present disclosure, however, alternative embodiments are also possible within the scope of the present invention. Module 246 may be embodied as a unified module within media agent 244/245, layered on existing media agent code, or may be a logical construct whose functionality is distributed through one or more other functional modules of the media agent—and in any combination thereof. In some alternative embodiments, unified-snapshot module 246 may execute on another computing component that is physically distinct from media agent 244/245, such as on a dedicated server that operates in conjunction with media agent 244/245, but which may or may not be a logical component of media agent 244/245.

Unified-snapshot storage policy 248 is an enhanced storage policy. One advantageous aspect of unified-snapshot storage policy 248 is that it may be used, at the system-wide level, to launch unified-snapshot jobs. Rather than configuring storage policies that are directed at and are launched on a subclient basis as in the prior art, the illustrative unified-snapshot storage policy operates 248 at the system level to enable the system to automatically discover the relevant components for which snapshots are to be taken on a unified basis. This unified approach is more streamlined operationally and, by generating fewer snapshots, the approach is more efficient for the storage array(s). As compared to some prior art solutions (see, e.g., U.S. Pat. Pub. No. 2014/0201150, entitled "Single Snapshot for Multiple Agents"), the present approach enables any combination of subclients, whether part of one client or many clients, to be represented in one per-LUN unified snapshot based on a given unified-snapshot storage policy 248. Thus, the illustrative embodiment provides both (i) increased granularity of choice, by allowing any combination of subclients to associate with a given unified-snapshot storage policy regardless of the identity of the subclients' respective clients; and (ii) substantially fewer snapshot operations and resultant snapshots, which more efficiently utilizes the system's storage arrays.

Exemplary administrative parameters for a unified-snapshot storage policy may include without limitation: an option for application-consistent snapshots versus crash-consistent snapshots.

Figure 3:
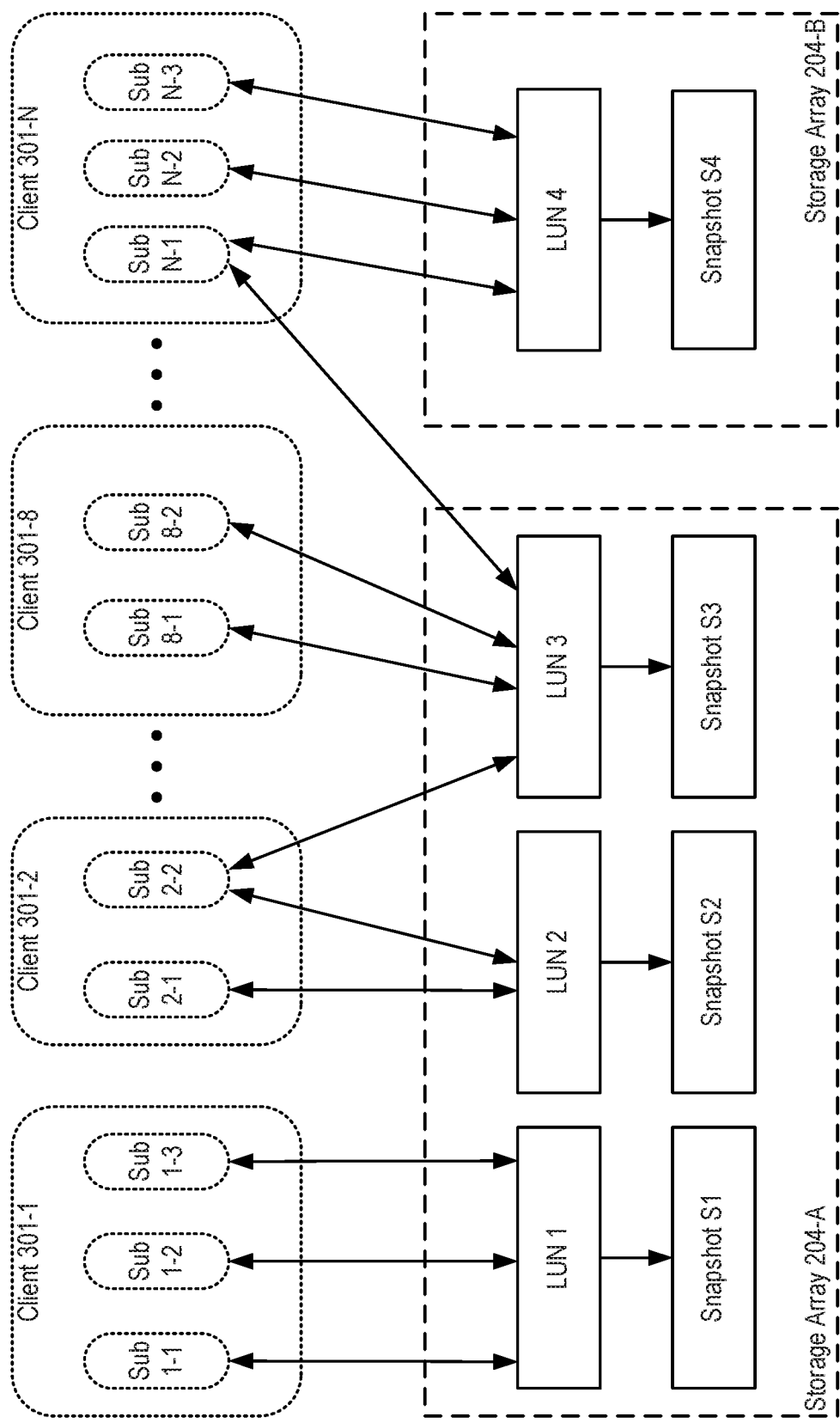
FIG. 3 is a block diagram illustrating some logical relationships among certain components of storage management system 200.

FIG. 3 is a block diagram illustrating some logical relationships among certain components of storage management system 200. In addition to the components illustrated in the preceding figure, system 200 further comprises: storage array 204-A and storage array 204-B; clients 301 (e.g., 301-1, 301-2, . . . , 301-8, . . . , 301-n; subclients 1-1, 1-2, and 1-3 part of client 301-1; subclients 2-1 and 2-2 part of client 301-2; subclients 8-1 and 8-2 part of client 301-8; subclients n-1, n-2, and n-3 part of client 301-n; logical unit numbers 1 (LUN 1), 2 (LUN 2), 3 (LUN 3) and 4 (LUN 4) and corresponding snapshots S1, S2, S3, and S4, respectively.

Storage arrays 204-A and 204-B were described in a preceding figure. Storage array 204-A may be a different manufacture or technology from storage array 204-B. Storage arrays 204 are snapshot-enabled, and may receive instructions to generate and store hardware snapshots. Storage arrays 204 illustratively provide storage resources to computing devices via logical unit numbers ("LUNs").

LUN 1, LUN 2, LUN3, and LUN 4 are portions of storage in a storage array 204, which are designated by a respective logical unit number. These storage portions shall be referred to herein by their LUN designation, such as LUN 1. Logical unit numbers LUN 1, LUN 2, and LUN 3 are hosted by storage array 204-A; LUN 4 is hosted by storage array 204-B. Illustratively, LUN 1 comprises data of subclients 1-1, 1-2, and 1-3, thus comprising data from client 301-1. Illustratively, LUN 2 comprises data of subclients 2-1 and 2-2, thus comprising data from client 301-2. Illustratively, LUN 3 comprises data of subclients 2-2, 8-1, 8-2, and n-1, thus comprising data from clients 301-2, 301-8, and 301-n. Illustratively, LUN 4 comprises data of subclients n-1, n-2, and n-3, thus comprising data from client 301-n.

Clients 301 (e.g., 301-1, 301-2, . . . , 301-8, . . . , 301-n). A "client" is a logical component of system 200, which may represent a logical grouping of one or more agents installed on a client computing device 202. Storage manager 240 may recognize a client as a component of system 200, and in some embodiments, may automatically create a client component the first time a data agent (e.g., 242) is installed on a client computing device 202. Because data generated by the executable component(s) 110 is tracked by the associated data agent 242 so that it may be properly protected in system 200, a client 301 may be said to generate data and to store the generated data to primary storage such as storage array 204. A client may be said to store data to one or more LUNs, e.g., client 301-1 storing data to LUN 1.

Subclients 1-1, 1-2, 1-3, 2-1, . . . , n-3. A "subclient" may represent a logical grouping of all or part of a client's primary data (e.g., subclient 1-1 is part of client 301-1). In general a subclient may be defined according to how the subclient data is to be protected as a unit in system 200. For example, a subclient may be associated with a certain storage policy; in the illustrative embodiment in particular, a subclient may be associated with unified-snapshot storage policy 248. A given client may thus comprise several subclients, each subclient associated with a different storage policy. For example, some files may form a first subclient that requires compression and deduplication and is thus associated with a first storage policy. Other files of the client may form a second subclient that requires a different retention schedule and also requires encryption, and is thus associated with a different, second storage policy. As a result, though the primary data may be generated by the same executable component 110, and may belong to one given client, portions of the data may be assigned to different subclients for distinct treatment by system 200.

Snapshots S1, S2, S3, and S4 are hardware snapshots of LUN 1, LUN 2, LUN 3, and LUN 4, respectively. Snapshots S1, S2, S3, and S4 are illustratively LUN-level copies of the corresponding target LUN. The snapshots are generated and stored by the hosting storage array 204-A and 204-B. Thus storage array 204-A generates and stores snapshots S1, S2, and S3; storage array 204-B generates and stores snapshot S4. Any kind of hardware snapshot may be used according to the illustrative embodiment, e.g., clone, mirror, space-efficient, replica, etc., according to the technology supported by the respective storage array and using the vendor terminology associated with the storage array.

Executing a unified-snapshot job based on a unified-snapshot storage policy 248 generates at most one snapshot for each LUN in system 200, regardless of the number of clients that store primary data to the respective LUN. For example, if subclients 2-2, 8-1, 8-2, and n-1 all are snapshot-eligible and are associated with unified-snapshot storage policy 248, when a unified-snapshot job is executed based on unified-snapshot storage policy 248, the result is that only one snapshot S3 is generated for LUN 3, even though four distinct subclients and three distinct clients are involved.

The table below illustrates the advantage of the illustrative embodiment's unified-snapshot approach as compared to prior-art approaches:

TABLE 1

Contrasting prior-art approaches versus "one-click" unified snapshots according to the illustrative embodiment (based on FIG. 3)

| Column (1) LUN ID (see FIG. 3) | (2) Traditional Prior-Art Snapshots Taken Per Subclient | (3) Prior-Art Snapshots Shared Per Client | (4) Illustrative "one-click" Unified Snapshots |
|---|---|---|---|
| 1 | 3 | 1 (for client 301-1) | 1 |
| 2 | 2 | 1 (for client 301-2) | 1 |

TABLE 1-continued

Contrasting prior-art approaches versus "one-click" unified snapshots according to the illustrative embodiment (based on FIG. 3)

| Column (1) LUN ID (see FIG. 3) | (2) Traditional Prior-Art Snapshots Taken Per Subclient | (3) Prior-Art Snapshots Shared Per Client | (4) Illustrative "one-click" Unified Snapshots |
|---|---|---|---|
| 3 | 4 | 3 (for clients 301-2, 301-8, and 301-n) | 1 |
| 4 | 3 | 1 (for client 301-n) | 1 |
| All | 12 | 6 | 4 |

Column (2) in Table 1 illustrates the traditional prior-art approach in which snapshots are taken per subclient, because backup jobs are launched at the subclient level. The result is that, for the ten (10) subclients in the configuration of FIG. 3, twelve (12) snapshots would be generated and stored in accordance with this traditional approach. Because the backup jobs are at the subclient level, ten (10) jobs would be required to cover the ten subclients.

Column (3) in Table 1 illustrates another approach in the prior art in which snapshots may be shared but only at the client level, as described in U.S. Pat. Pub. No. 2014/0201150, entitled "Single Snapshot for Multiple Agents." The result is that six (6) snapshots would be generated and stored accordingly, because sharing is permitted at the client level. While fewer than twelve, six snapshots are still more snapshots than what the illustrative embodiment yields, namely only four (4) snapshots, as shown in column (4).

Column (4) in Table 1 illustrates that the illustrative embodiment yields at most one snapshot per target LUN, regardless of the number of clients whose data may be stored on the target LUN may store. This is most dramatically illustrated in regard to LUN 3, which comprises data from three different clients and four different subclients. With hundreds or thousands of LUNs and hundreds or thousands of snapshot operations in a given storage management system such as system 200, the savings produced by the illustrative unified-snapshot approach are significant. Since storage arrays typically have hard limits on the number of snapshots they may store, the present approach may significantly extend the utility and longevity of a storage array. (Of course, each unified-snapshot job according to the illustrative embodiment yields its own set of snapshots, which is based on the governing unified-snapshot storage policy and the subclients associated thereto.)

Figure 4:
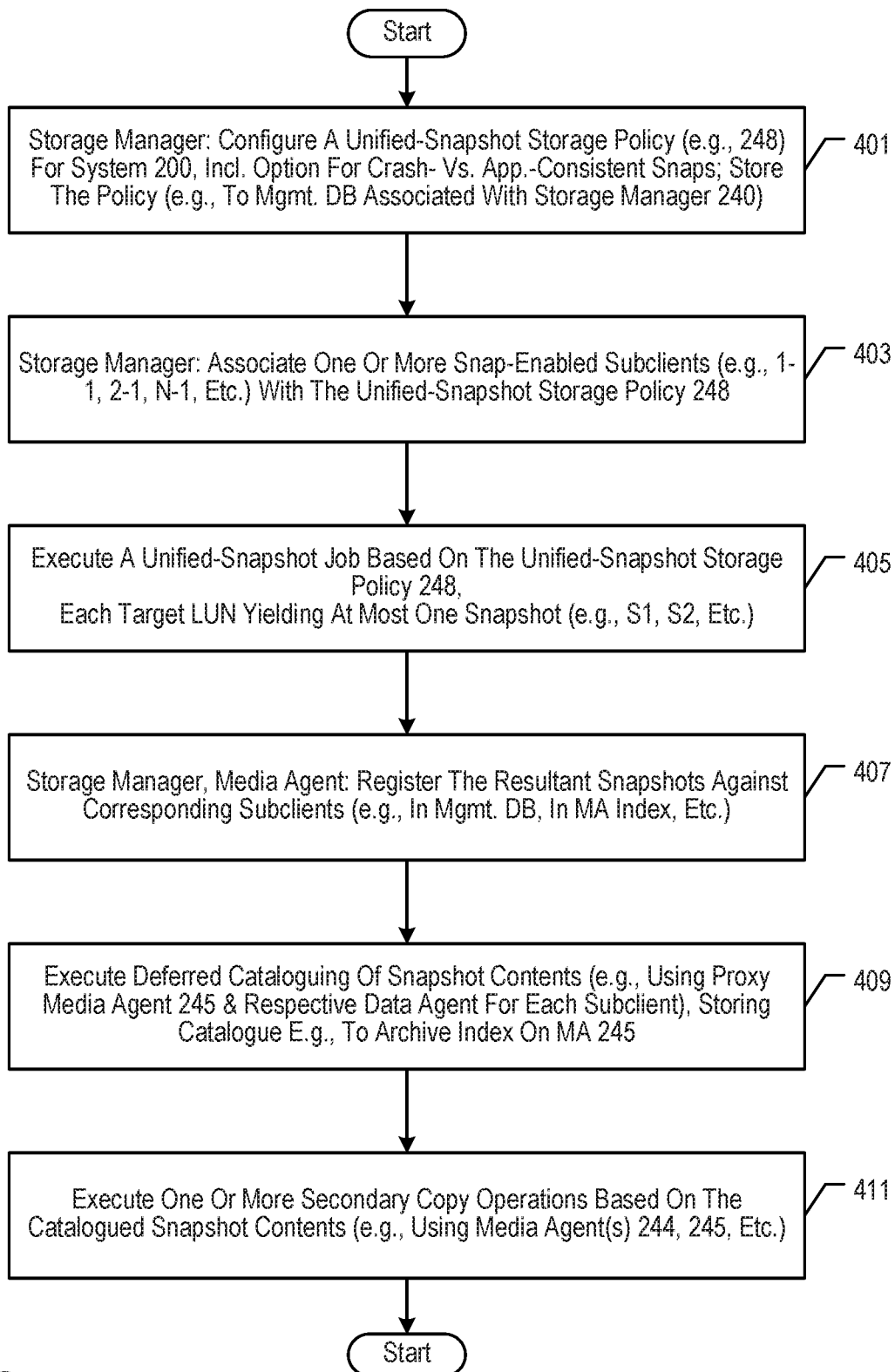
FIG. 4 depicts some salient operations of a method 400 according to an illustrative embodiment of the present invention.

FIG. 4 depicts some salient operations of a method 400 according to an illustrative embodiment of the present invention. The operations of method 400 are performed by one or more components of system 200 as described in further detail below, including enhanced storage manager 240, enhanced media agents 244/245, and/or enhanced data agents 242.

At block 401, storage manager 240 (e.g., using unified-snapshot manager module 241) may configure a unified-snapshot storage policy (e.g., 248) for system 200, including an option for crash-consistent versus application-consistent snapshots. Storage manager 240 may store the policy (e.g., to a management database associated with storage manager 240 such as 146). Any number of unified-snapshot storage policies 248 may be configured in system 200.

At block 403, storage manager 240 (e.g., using unified-snapshot manager module 241) may associate one or more snap-enabled subclients (e.g., 1-1, 2-1, n-1, etc.) with a unified-snapshot storage policy 248. When system 200 comprises more than one unified-snapshot storage policy 248, any given subclient may associate with one of the available unified-snapshot storage policies 248. Storage manager 240 may store the association (e.g., to a management database associated with storage manager 240 such as 146).

At block 405, a unified-snapshot job may be executed based on unified-snapshot storage policy 248, each target LUN yielding at most one snapshot, e.g., S1, S2, etc., which is stored on the storage array 204 that hosts the target LUN. The job may be triggered by a schedule parameter for the storage policy, e.g., every 10 minutes. The job may be managed by storage manager 240. More details on block 405 may be found in a subsequent figure.

At block 407, the snapshots resulting from the unified-snapshot job are registered against corresponding subclients. A snapshot comprising data of a certain subclient is registered against (e.g., associated with) the subclient. A snapshot comprising data of several subclients would be registered against (e.g., associated with) each constituent subclient. The present operation may be performed by storage manager 240 (e.g., using unified-snapshot manager module 241) and/or by the media agent (e.g., 244) that participated in the unified-snapshot job (e.g., using unified-snapshot module 246). The registration data may be stored in the management database of storage manager 240 and/or in the media agent's local index.

At block 409, deferred cataloguing of snapshot contents occurs. This operation may immediately follow the completion of the unified-snapshot job or may occur at a later time, such when system 200 is less busy, and may involve a different media agent (e.g., proxy media agent 245) than the one involved in the unified-snapshot job. The cataloguing operation identifies the contents of each snapshot generated in the unified-snapshot job, i.e., generates metadata about the snapshot contents, and associates the metadata with the appropriate subclient that owns the data. For each subclient that was targeted by the unified-snapshot job, the associated data agent 242 is involved in analyzing the snapshotted data and cataloguing it. The cataloguing may be managed by storage manager 240. The resulting catalogue may be stored to the media agent's index and/or to the management database associated with storage manager 240.

At block 411, one or more secondary copy operations may be executed based on the catalogued snapshot contents (e.g., using media agent(s) 244, 245, etc.). As explained earlier herein, these secondary copy operations may be managed by storage manager 240, e.g., backing up a given subclient's data in snapshot S1 to a secondary copy 116, making an archive copy of the subclient's data in snapshot S1 and storing it to tape, deduplicating the subclient's data taken from snapshot S1 and storing it to disk library 108, etc., without limitation. The secondary copies may be stored to a secondary storage device such as disk library 108, tape library, etc., without limitation.

Figure 5:
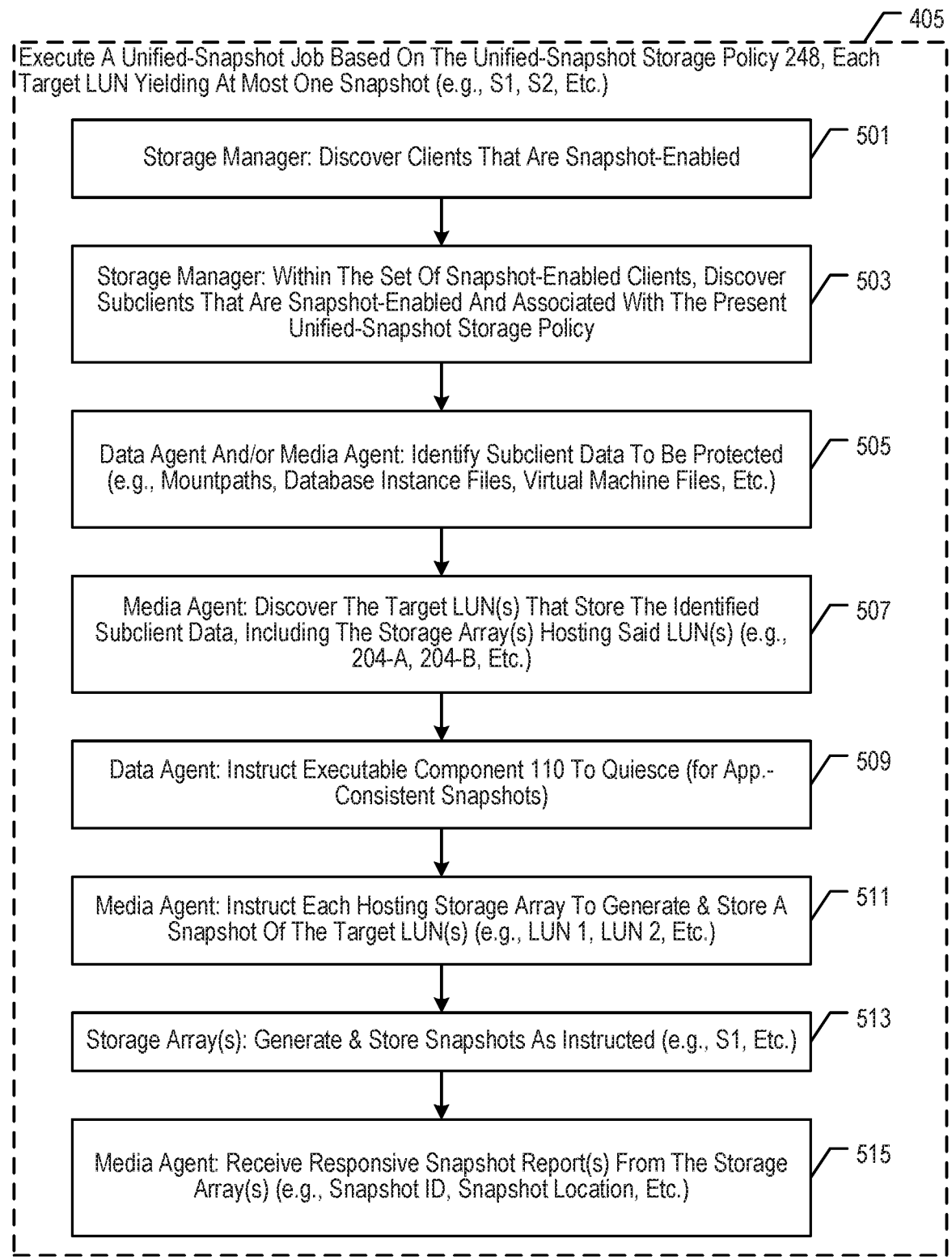
FIG. 5 depicts a number of sub-operations of block 405 in method 400.

FIG. 5 depicts a number of sub-operations of block 405 in method 400. Block 405 is generally directed at executing a unified-snapshot job based on the unified-snapshot storage policy 248, each target LUN yielding at most one snapshot (e.g., S1, S2, etc.) in the course of the unified-snapshot job, regardless of the number of clients that store data to the target LUN. Thus, one snapshot may cover any number of clients' and subclients' data. Each unified-snapshot job generates its own set of one or more appropriate snapshots based on the governing unified-snapshot storage policy 248 and the subclients associated thereto.

At block 501, storage manager 240 (e.g., using unified-snapshot manager module 241) may discover clients that are snapshot-enabled in system 200. Storage manager 240 may consult management database 146 for this discovery operation. Clients that are not snapshot-enabled are generally not eligible for unified-snapshot jobs.

At block 503, storage manager 240 may traverse the set of snapshot-enabled clients to discover the subclients that are snapshot-enabled and also are associated with the present unified-snapshot storage policy. Accordingly, storage manager 240 may discover the target subclients that are eligible for the present unified-snapshot job.

At block 505, for each target subclient discovered in the preceding block, its associated data agent 242 and/or media agent 244 may identify subclient data to be protected in the unified-snapshot job. Accordingly, in this operation, mount-paths, database instance files, virtual machine files, etc. may define the subclient data which is to be protected.

At block 507, media agent 244 may discover the target LUN(s) that store the identified data of the target subclients. This operation includes discovering the storage array(s) that host the discovered target LUN(s) (e.g., 204-A, 204-B, etc.).

At block 509, data agent 242 may instruct executable component 110 to quiesce in anticipation of a snapshot. This operation applies to unified-snapshot jobs based on a unified-snapshot storage policy that is configured for "application-consistent" snapshots (consistent to the executable component in a manner relevant to the respective component). When the governing unified-snapshot storage policy is not configured for application-consistent snapshots, e.g., may be configured for crash-consistent snapshots (whether by default or through appropriate administration), the respective component 110 is not "aware" that a snapshot is about to be taken by the storage array and consequently is not quiesced in anticipation of the snapshot operation.

At block 511, media agent 244, having discovered the target LUNs (e.g., LUN 1, LUN 2, LUN 3, LUN 4, etc.), may instruct each hosting storage array (e.g., 204-A and 204-B) to generate and store a snapshot of the target LUN(s). Storage arrays 204 that do not comprise a target LUN are not instructed to generate snapshots, thus limiting snapshot operations to storage arrays that comprise data belonging to a subclient associated with the present unified-snapshot storage policy. Likewise, storage arrays 204 are not instructed to generate snapshots of non-target LUNs, thus limiting the snapshots to LUNs that comprise data belonging to a subclient associated with the present unified-snapshot storage policy.

At block 513, storage array(s) 204 (e.g., 204-A and 204-B) may generate and store snapshots as instructed (e.g., S1, S2, S3, S4, etc.). Executing snapshot operations in response to instruction(s) issued by a media agent such as media agent 244 is well known in the art and is generally available technology in present-day storage arrays.

At block 515, media agent 244 may receive responsive snapshot report(s) from the storage array(s) during and after the instructed snapshot operations performed by the respective storage array(s). For example, a storage array 204 may report information such as snapshot ID, LUN association, and snapshot location, etc., to enable media agent 244 to track the existence of the snapshot going forward and to use the snapshot in later storage management operations (see, e.g., block 409 and 411). The operations of block 405 may end here and control may pass to the next block in method 400.

In regard to the components, blocks, operations and/or sub-operations described in reference to FIGS. 2-5, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation.

Example Embodiments

An illustrative method for snapshot management in a storage management system that comprises one or more snapshot-capable storage arrays hosting a plurality of logical unit numbers is provided. The method may comprise: executing a unified-snapshot job that generates at most one snapshot for a logical unit number in the plurality of logical unit numbers, regardless of the number of clients that store primary data to the respective logical unit number; wherein the executing of the unified-snapshot job comprises: discovering, by a storage manager, a first subclient of a first client and a second subclient of a second client which is distinct from the first client, wherein the first client generates first primary data that is stored to one or more logical unit numbers in the plurality of logical unit numbers, and wherein the first subclient represents a logical grouping of part of the first primary data, and wherein the second client generates second primary data that is stored to at least one of the one or more logical unit numbers storing the first primary data, and wherein the second subclient represents a logical grouping of part of the second primary data, discovering, by a media agent component of the storage management system, a first logical unit number in the plurality of logical unit numbers, wherein the first logical unit number comprises (i) data of the first subclient and (ii) data of the second subclient, instructing, by the media agent, a first storage array that hosts the first logical unit number to generate and store a first snapshot of the first logical unit number; and registering, by at least one of the media agent and the storage manager: (a) a first association between the generated first snapshot of the first logical unit number and the first subclient, and (b) a second association between the generated first snapshot of the first logical unit number and the second subclient.

The above-recited method may further comprise: cataloguing the first snapshot generated in the unified-snapshot job relative to the first subclient, based on the respective registered association, wherein the cataloguing is performed at least in part by a first data agent associated with the first client. The above-recited method wherein the cataloguing associates a file of the first subclient with a datapath to the file in the first snapshot. The above-recited method may further comprise: after the unified-snapshot job is completed: (A) cataloguing the first snapshot generated in the unified-snapshot job relative to the first subclient, based on the respective registered association, wherein the cataloguing is performed at least in part by a first data agent associated with the first client, and (B) cataloguing the first snapshot generated in the unified-snapshot job relative to the second subclient, based on the respective registered association, wherein the cataloguing is performed at least in part by a second data agent associated with the second client. The above-recited method wherein the cataloguing associates a first file of the first subclient with a first datapath to the first file in the first snapshot, and associates a second file of the second subclient with a second datapath to the second file in the first snapshot. The above-recited method may further comprise: wherein a logical unit number designates a portion of storage in a storage array. The above-recited method wherein a volume configured in a client computing device maps to at least one logical unit number in the plurality of logical unit numbers. The above-recited method wherein a logical unit number in the plurality of logical unit numbers designates at least one volume configured on a client computing device. The above-recited method wherein the unified-snapshot job unifies the data of the first subclient in the first logical unit number and the data of the second subclient in the first logical unit number into at most one snapshot of the first logical unit number regardless of the number of clients that store respective primary data to the first logical unit number. The above-recited method wherein the unified-snapshot job unifies the data of the first subclient in the first logical unit number and the data of the second subclient in the first logical unit number into at most one snapshot of the first logical unit number regardless of the number of clients that store respective primary data to the first logical unit number, and wherein the unified-snapshot job is based on a storage policy associated with the first subclient and the second subclient. The above-recited method wherein the first snapshot is a crash-consistent snapshot. The above-recited method wherein the first snapshot is an application-consistent snapshot.

According to another embodiment, a method for snapshot management in a storage management system that comprises one or more snapshot-capable storage arrays hosting a plurality of logical unit numbers may be provided. The method may comprise: executing a unified-snapshot job that generates at most one snapshot for a logical unit number in the plurality of logical unit numbers, regardless of the number of clients that store primary data to the respective logical unit number; wherein the executing of the unified-snapshot job comprises: discovering, by a storage manager, a first subclient of a first client, wherein the first client generates first primary data that is stored to one or more logical unit numbers in the plurality of logical unit numbers, and wherein the first subclient represents a logical grouping of part of the first primary data, discovering, by a media agent component of the storage management system, a first logical unit number in the plurality of logical unit numbers, wherein the first logical unit number comprises data of the first subclient; and registering, by at least one of the media agent and the storage manager, a first association between the generated first snapshot of the first logical unit number and the first subclient.

The above-recited method may further comprise: cataloguing the first snapshot generated in the unified-snapshot job relative to the first subclient, based on the registered first association, wherein the cataloguing is performed at least in part by a first data agent associated with the first client. The above-recited method may further comprise: cataloguing the first snapshot generated in the unified-snapshot job relative to the first subclient, based on the registered first association, wherein the cataloguing is performed at least in part by a first data agent associated with the first client, and wherein the cataloguing associates a file of the first subclient with a datapath to the file in the first snapshot. The above-recited method may further comprise: after the unified-snapshot job is completed, cataloguing the first snapshot generated in the unified-snapshot job relative to the first subclient, based on the registered first association, wherein the cataloguing is performed at least in part by a media agent. The above-recited method may further comprise: after the unified-snapshot job is completed, cataloguing the first snapshot generated in the unified-snapshot job relative to the first subclient, based on the registered first association, wherein the cataloguing is performed at least in part by a media agent, wherein the cataloguing associates a first file of the first subclient with a first datapath to the first file in the first snapshot. The above-recited method wherein a logical unit number designates a portion of storage in a storage array. The above-recited method wherein a logical unit number designates a logical unit of storage in a storage array. The above-recited method wherein the first snapshot is a crash-consistent snapshot. The above-recited method wherein the first snapshot is an application-consistent snapshot.

According to yet another aspect, a method for snapshot management in a storage management system that comprises one or more snapshot-capable storage arrays hosting a plurality of logical unit numbers may be provided. The method may comprise: configuring, by a storage manager that manages the storage management system, a storage policy; associating, by the storage manager, one or more subclients with the storage policy, wherein the storage management system comprises a plurality of clients, wherein each client generates primary data that is stored to one or more logical unit numbers hosted by one or more storage arrays, and wherein each subclient of a client represents a logical grouping of part of the client's primary data; executing a unified-snapshot job based on the storage policy, wherein the executing is managed by the storage manager, and wherein the executing comprises: discovering, by the storage manager, a plurality of subclients that are associated with the storage policy, wherein the plurality of subclients comprises a first subclient of a first client and a second subclient of a second client which is distinct from the first client, discovering, by a media agent component of the storage management system, a first logical unit number that comprises (i) data of the first subclient and (ii) data of the second subclient, and instructing, by the media agent, a first storage array that hosts the discovered first logical unit number to generate and store a first snapshot of the first logical unit number; registering, by at least one of the media agent and the storage manager, (a) a first association between the generated first snapshot of the first logical unit number and the first subclient, and (b) a second association between the generated first snapshot of the first logical unit number and the second subclient; and cataloguing the first snapshot relative to the first subclient and the second subclient, based on the respective registered association, wherein the cataloguing is performed at least in part by a data agent.

The above-recited method wherein executing the unified-snapshot job further comprises discovering, by the storage manager, a plurality of subclients that are snapshot-enabled. The above-recited method wherein the data agent is associated with one of the first client and the second client. The above-recited method wherein executing the unified-snapshot job based on the storage policy generates only one snapshot for a discovered logical unit number, regardless of the number of clients that store primary data to the respective discovered logical unit number. The above-recited method wherein the unified-snapshot job generates only one snapshot for a discovered logical unit number, regardless of the number of subclients whose data a discovered logical unit comprises. The above-recited method wherein executing the unified-snapshot job based on the storage policy generates only one snapshot for a discovered logical unit number, regardless of the number of subclients representing data stored to the respective discovered logical unit number. The above-recited method wherein the cataloguing is performed in part by a media agent, which is the same component as the media agent that performs the instructing. The above-recited method wherein the cataloguing is performed in part by a media agent, which is a different component from the media agent that performs the instructing. The above-recited method wherein the unified-snapshot job unifies the data of the first subclient in the first logical unit number and the data of the second subclient in the first logical unit number into at most one snapshot of the first logical unit number regardless of the number of clients that store respective primary data to the first logical unit number. The above-recited method wherein the first snapshot is a crash-consistent snapshot. The above-recited method wherein the first snapshot is an application-consistent snapshot.

According to another example, a method for snapshot management in a storage management system that comprises one or more snapshot-capable storage arrays hosting a plurality of logical unit numbers may be provided. The method may comprise: generating, by a storage array, a snapshot of a logical unit number hosted by the storage array, based on a unified-snapshot job that is based on a storage policy, wherein the unified-snapshot job comprises: selecting, by a storage manager that managers the storage management system, a first subclient that is associated with the storage policy, wherein the first subclient represents a logical grouping of part of a first client's primary data, and wherein the first client's primary data is stored to one or more logical unit numbers in the plurality of logical unit numbers, selecting, by the storage manager, a second subclient that is associated with the storage policy, wherein the second subclient represents a logical grouping of part of a second client's primary data, and wherein the second client's primary data is stored to one or more logical unit numbers in the plurality of logical unit numbers, discovering, by a media agent component of the storage management system, the logical unit number that stores data of the first subclient and also stores data of the second subclient, instructing, by the media agent, the storage array which hosts the discovered logical unit number to generate and store the snapshot of the logical unit number, wherein the snapshot comprises the data of the first subclient and also comprises the data of the second subclient; and registering, by at least one of the media agent and the storage manager: (a) a first association between the generated snapshot and the first subclient, and (b) a second association between the generated snapshot and the second subclient.

The above-recited method wherein the unified-snapshot job generates at most one snapshot for a logical unit number that comprises data of one or more subclients, regardless of the number of clients that store primary data to the respective logical unit number, wherein each subclient is associated with the storage policy. The above-recited method may further comprise: after the unified-snapshot job is completed, cataloguing the snapshot relative to the first subclient, based on the respective registered association, wherein the cataloguing is performed at least in part by a first data agent associated with the first client. The above-recited method may further comprise: cataloguing the snapshot relative to the first subclient, based on the respective registered association, wherein the cataloguing is performed at least in part by a first data agent associated with the first client; and cataloguing the snapshot relative to the second subclient, based on the respective registered association, wherein the cataloguing is performed at least in part by a second data agent associated with the second client. The above-recited method may further comprise: cataloguing the snapshot relative to the first subclient, based on the respective registered association, wherein the cataloguing is performed at least in part by a first data agent associated with the first client; and generating a secondary copy of the first subclient's data, based on the catalogued snapshot; and storing, by a media agent, the secondary copy to a secondary storage device associated with the media agent.

According to another embodiment, a method for snapshot management in a storage management system that comprises one or more snapshot-capable storage arrays hosting a plurality of logical unit numbers may be provided. The method may comprise: generating, by a storage array, a snapshot of a logical unit number hosted by the storage array, based on a unified-snapshot job that is based on a storage policy, wherein the unified-snapshot job generates at most one snapshot for a logical unit number that comprises data of one or more subclients, regardless of the number of clients that store primary data to the respective logical unit number, wherein each subclient is associated with the storage policy, and wherein the unified-snapshot job comprises: selecting, by a storage manager that managers the storage management system, a first subclient that is associated with the storage policy, wherein the first subclient represents a logical grouping of part of a first client's primary data, and wherein the first client's primary data is stored to one or more logical unit numbers in the plurality of logical unit numbers. The above-recited method wherein the unified-snapshot job further comprises: selecting, by the storage manager, a second subclient that is associated with the storage policy, wherein the second subclient represents a logical grouping of part of a second client's primary data, and wherein the second client's primary data is stored to one or more logical unit numbers in the plurality of logical unit numbers. The above-recited method wherein the unified-snapshot job further comprises: discovering, by a media agent component of the storage management system, the logical unit number that stores data of the first subclient and also stores data of the second subclient. The above-recited method may further comprise: discovering, by a media agent component of the storage management system, the logical unit number that stores data of the first subclient and also stores data of the second subclient, instructing, by the media agent, the storage array which hosts the discovered logical unit number to generate and store the snapshot of the logical unit number, wherein the snapshot comprises the data of the first subclient and also comprises the data of the second subclient. The above-recited method may further comprise: registering, by at least one of a media agent and the storage manager: (a) a first association between the generated snapshot and the first subclient, and (b) a second association between the generated snapshot and the second subclient. The above-recited method may further comprise: after the unified-snapshot job is completed, cataloguing the snapshot relative to the first subclient, based on a respective registered association between the generated snapshot and the first subclient. The above-recited method may further comprise: after the unified-snapshot job is completed, cataloguing the snapshot relative to the first subclient, based on a respective registered association between the generated snapshot and the first subclient, wherein the cataloguing is performed at least in part by a first data agent associated with the first client.

According to another embodiment, a storage management system for unified snapshot management may be provided. The storage management system may comprise: a storage manager comprising a storage policy; a first client computing device in communication with the storage manager, wherein the first client computing device comprises a first executable component and an associated first data agent; a second client computing device in communication with the storage manager, wherein the second client computing device comprises a second executable component and an associated second data agent; a secondary storage computing device in communication with the storage manager, wherein the secondary storage computing device comprises a media agent; a storage array in communication with at least the first and second client computing devices and with the secondary storage computing device, wherein the storage array hosts at least one logical unit number that comprises primary data generated by the first and second executable components; a first subclient that represents a first part of primary data generated by the first executable component, wherein the storage manager comprises an association between the first subclient and the storage policy; a second subclient that represents a second part of primary data generated by the second executable component, wherein the storage manager comprises an association between the second subclient and the storage policy; and a snapshot of a logical unit number resulting from a unified-snapshot job managed by the storage manager based on the storage policy, wherein at most one snapshot of the logical unit number results from the unified-snapshot job regardless of the number of executable components that store respective primary data to the logical unit number.

The above-recited storage management system wherein the first executable component is at least one of an application, an operating system, a file system, and a virtual machine, and wherein the second executable component is at least one of an application, an operating system, a file system, and a virtual machine. The above-recited storage management system wherein the first client computing device is the same component as the second client computing device, and comprises both the first executable component and the second executable component. The above-recited storage management system wherein the storage manager is configured to discover the first subclient and the second subclient, based on a respective association with the storage policy. The above-recited storage management system wherein the media agent is configured to discover a first logical unit number that comprises (i) data of the first subclient and (ii) data of the second subclient, and wherein the snapshot resulting from the unified-snapshot job is a snapshot of the first logical unit number. The above-recited storage management system wherein the media agent is configured to instruct the storage array to generate and store a snapshot of a first logical unit number that comprises (i) data of the first subclient and (ii) data of the second subclient. The above-recited storage management system wherein the storage manager is configured to register (a) a first association between the first subclient and a first snapshot of a first logical unit number that comprises (i) data of the first subclient and (ii) data of the second subclient, and (b) a second association between the second subclient and the first snapshot. The above-recited storage management system wherein the media agent is configured to register (a) a first association between the first subclient and a first snapshot of a first logical unit number that comprises (i) data of the first subclient and (ii) data of the second subclient, and (b) a second association between the second subclient and the first snapshot. The above-recited storage management system wherein the first data agent is configured to catalogue, at least in part, a snapshot of a first logical unit number that comprises (i) data of the first subclient and (ii) data of the second subclient. The above-recited storage management system wherein the logical unit number designates a portion of storage in the storage array. The above-recited storage management system wherein the logical unit number designates a logical unit of storage in the storage array. The above-recited storage management system wherein the first snapshot is a crash-consistent snapshot. The above-recited storage management system wherein the first snapshot is an application-consistent snapshot.

According to another embodiment, a storage management system for unified snapshot management may be provided. The storage management system may comprise: a storage manager comprising a storage policy; a first client computing device in communication with the storage manager, wherein the first client computing device comprises a first executable component and an associated first data agent; a second client computing device in communication with the storage manager, wherein the second client computing device comprises a second executable component and an associated second data agent; a storage array in communication with at least the first and second client computing devices and with the secondary storage computing device, wherein the storage array hosts at least one logical unit number that comprises primary data generated by the first and second executable components; a first subclient that represents a first part of primary data generated by the first executable component, wherein the storage manager comprises an association between the first subclient and the storage policy; a second subclient that represents a second part of primary data generated by the second executable component, wherein the storage manager comprises an association between the second subclient and the storage policy; and a snapshot of a logical unit number resulting from a unified-snapshot job managed by the storage manager based on the storage policy, wherein at most one snapshot of the logical unit number results from the unified-snapshot job regardless of the number of executable components that store respective primary data to the logical unit number.

The above-recited storage management system wherein the first executable component is at least one of an application, an operating system, a file system, and a virtual machine, and wherein the second executable component is at least one of an application, an operating system, a file system, and a virtual machine. The above-recited storage management system may further comprise: a secondary storage computing device in communication with the storage manager, wherein the secondary storage computing device comprises a media agent that is configured to discover (i) one or more logical unit numbers that comprise data of the first subclient and (ii) one or more logical unit numbers that comprise data of the second subclient. The above-recited storage management system may further comprise: a secondary storage computing device in communication with the storage manager, wherein the secondary storage computing device comprises a media agent that is configured to instruct the storage array to generate and store a snapshot of one or more logical unit numbers that comprise at least one of (i) data of the first subclient and (ii) data of the second subclient. The above-recited storage management system may further comprise: a secondary storage computing device in communication with the storage manager, wherein the secondary storage computing device comprises a media agent that is configured to receive responsive reporting from the storage array in regard to the at most one snapshot taken for the one or more logical unit numbers. The above-recited storage management system may further comprise: a secondary storage computing device in communication with the storage manager, wherein the secondary storage computing device comprises a media agent that is configured to register (a) a first association between the first subclient and a first snapshot, and (b) a second association between the second subclient and the first snapshot. The above-recited storage management system wherein the logical unit number designates a portion of storage in the storage array. The above-recited storage management system wherein the logical unit number designates a logical unit of storage in the storage array. The above-recited storage management system wherein the first snapshot is a crash-consistent snapshot. The above-recited storage management system wherein the first snapshot is an application-consistent snapshot.

According to another aspect, a storage management system for unified snapshot management may be provided. The storage management system may comprise: a storage manager comprising a storage policy; a client computing device in communication with the storage manager, wherein the client computing device comprises at least one executable component and a corresponding associated data agent; a storage array in communication with the client computing device and with the secondary storage computing device, wherein the storage array hosts at least one logical unit number that comprises primary data generated by the executable component; a first subclient that represents a first part of the primary data generated by the executable component, wherein the storage manager comprises an association between the first subclient and the storage policy; and a snapshot of a logical unit number resulting from a unified-snapshot job managed by the storage manager based on the storage policy, wherein at most one snapshot of the logical unit number results from the unified-snapshot job regardless of the number of executable components that store respective primary data to the logical unit number.

The above-recited storage management system wherein an executable component is at least one of an application, an operating system, a file system, and a virtual machine. The above-recited storage management system may further comprise: a secondary storage computing device in communication with the storage manager, wherein the secondary storage computing device comprises a media agent that is configured to discover (i) one or more logical unit numbers that comprise data of the first subclient. The above-recited storage management system may further comprise: a secondary storage computing device in communication with the storage manager, wherein the secondary storage computing device comprises a media agent that is configured to instruct the storage array to generate and store the snapshot. The above-recited storage management system may further comprise: a secondary storage computing device in communication with the storage manager, wherein the secondary storage computing device comprises a media agent that is configured to receive responsive reporting from the storage array in regard to the snapshot. The above-recited storage management system may further comprise: a secondary storage computing device in communication with the storage manager, wherein the secondary storage computing device comprises a media agent that is configured to register a first association between the first subclient and the snapshot. The above-recited storage management system wherein the logical unit number designates a portion of storage in the storage array. The above-recited storage management system wherein the logical unit number designates a logical unit of storage in the storage array.

According to yet another embodiment, a storage management system for unified snapshot management may be provided. The storage management system may comprise: a storage manager comprising a storage policy; a client computing device in communication with the storage manager, wherein the client computing device comprises an executable component and an associated data agent; a storage array in communication with the client computing device and with the secondary storage computing device, wherein the storage array hosts at least one logical unit number that comprises primary data generated by the executable component; a first subclient component that represents a first part of the primary data generated by the executable component; and wherein the storage manager is configured to manage a unified-snapshot job based on the storage policy, wherein relative to a logical unit number that comprises the first subclient's data at most one snapshot of the logical unit number results from the unified-snapshot job regardless of the number of executable components that store respective primary data to the logical unit number. The above-recited storage management system wherein the executable component is at least one of an application, an operating system, a file system, and a virtual machine. The above-recited storage management system wherein the storage manager is further configured to configure the storage policy. The above-recited storage management system wherein the storage manager is further configured to associate the first subclient with the storage policy, wherein the unified-snapshot job applies only to subclients that are associated with the storage policy. The above-recited storage management system wherein the storage manager is further configured to discover a plurality of subclients that are associated with the storage policy, wherein the plurality of subclients includes the first subclient. The above-recited storage management system wherein the storage manager is further configured to register a first association between the first subclient and a first snapshot of a first logical unit number that stores data of the first subclient. The above-recited storage management system wherein the logical unit number designates a portion of storage in the storage array. The above-recited storage management system wherein the logical unit number designates a logical unit of storage in the storage array. The above-recited storage management system wherein the first snapshot is a crash-consistent snapshot. The above-recited storage management system wherein the first snapshot is an application-consistent snapshot.

According to yet another example, a method for using an enhanced media agent for snapshot management in a storage management system that comprises one or more snapshot-capable storage arrays hosting a plurality of logical unit numbers may be provided. The method may comprise: discovering, by a media agent component of the storage management system, a first logical unit number that comprises (i) data of a first subclient of a first client and (ii) data of a second subclient of a second client which is distinct from the first client, wherein each subclient of a client represents a logical grouping of part of the client's primary data, and wherein each client generates primary data that is stored to one or more logical unit numbers hosted by one or more storage arrays in the storage management system; instructing, by the media agent, a first storage array that hosts the discovered first logical unit number to generate and store a first snapshot of the first logical unit number; registering, by the media agent: (a) a first association between the first subclient and the first snapshot, and (b) a second association between the second subclient and the first snapshot; and wherein the unified-snapshot job generates at most one snapshot for the first logical unit number, regardless of the number of clients that store primary data to the first logical unit number.

The above-recited method may further comprise: receiving, by the media agent, responsive reporting from the storage array in regard to the first snapshot. The above-recited method may further comprise: cataloguing the first snapshot generated in the unified-snapshot job relative to the first subclient and the second subclient, based on the respective registered association, wherein the cataloguing is performed at least in part by the media agent. The above-recited method may further comprise: cataloguing the first snapshot generated in the unified-snapshot job relative to the first subclient and the second subclient, based on the respective registered association, wherein the cataloguing is performed at least in part by the media agent; and storing, by the media agent, a secondary copy of the first subclient's data in the first snapshot, generated based on the catalogued snapshot, to a secondary storage device associated with the media agent. The above-recited method may further comprise: cataloguing the first snapshot relative to the first subclient, based on the respective registered association, wherein the cataloguing is performed at least in part by the media agent in conjunction with a first data agent associated with the first client; and cataloguing the first snapshot relative to the second subclient, based on the respective registered association, wherein the cataloguing is performed at least in part by the media agent in conjunction with a second data agent associated with the second client. The above-recited method wherein the first logical unit number designates a portion of storage in the storage array. The above-recited method wherein the first logical unit number designates a logical unit of storage in the storage array. The above-recited method wherein the unified-snapshot job unifies the data of the first subclient in the first logical unit number and the data of the second subclient in the first logical unit number into at most one snapshot of the first logical unit number regardless of the number of clients that store respective primary data to the first logical unit number. The above-recited method wherein the unified-snapshot job, which is based on the storage policy, unifies the data of the first subclient in the first logical unit number and the data of the second subclient in the first logical unit number into at most one snapshot of the first logical unit number regardless of the number of clients that store respective primary data to the first logical unit number. The above-recited method wherein the first snapshot is a crash-consistent snapshot. The above-recited method wherein the first snapshot is an application-consistent snapshot.

According to another aspect, a method for using an enhanced storage manager for snapshot management in a storage management system that comprises one or more snapshot-capable storage arrays hosting a plurality of logical unit numbers may be provided. The method may comprise: configuring a storage policy, by the storage manager, wherein the storage manager manages the storage management system; associating, by the storage manager, one or more subclients with the storage policy, wherein each subclient of a client represents a logical grouping of part of the client's primary data, and wherein each client generates primary data that is stored to one or more logical unit numbers in the plurality of logical unit numbers; discovering, by the storage manager, a plurality of subclients that are associated with the storage policy, wherein the plurality of subclients comprises a first subclient of a first client and a second subclient of a second client which is distinct from the first client, and wherein a first logical unit number comprises (i) data of the first subclient and (ii) data of the second subclient; registering, by the storage manager: (a) a first association between the first subclient and a first snapshot of the first logical unit number, and (b) a second association between the second subclient and the first snapshot, wherein the first snapshot was generated and stored by a storage array in a unified-snapshot job; and wherein the unified-snapshot job generates at most one snapshot for a logical unit number, regardless of the number of clients that store primary data to the respective logical unit number.

The above-recited method wherein the storage manager manages the unified-snapshot job, based on the storage policy. The above-recited method wherein the first snapshot was generated based on the discovering operation performed by the storage manager. The above-recited method wherein the first logical unit number designates a portion of storage in the storage array. The above-recited method wherein the first logical unit number designates a logical unit of storage in the storage array. The above-recited method wherein the first snapshot is a crash-consistent snapshot. The above-recited method wherein the first snapshot is an application-consistent snapshot.

According to another embodiment, a method for using an enhanced storage manager for snapshot management in a storage management system that comprises one or more snapshot-capable storage arrays hosting a plurality of logical unit numbers may be provided. The method may comprise: configuring a storage policy, by the storage manager, wherein the storage manager manages the storage management system; associating, by the storage manager, one or more subclients with the storage policy, wherein each subclient of a client represents a logical grouping of part of the client's primary data, and wherein each client generates primary data that is stored to one or more logical unit numbers in the plurality of logical unit numbers; managing, by the storage manager, a unified-snapshot job based on the storage policy, wherein the unified-snapshot job comprises: discovering, by the storage manager, a plurality of subclients that are associated with the storage policy, wherein the plurality of subclients comprises a first subclient of a first client and a second subclient of a second client which is distinct from the first client, and wherein a first logical unit number comprises (i) data of the first subclient and (ii) data of the second subclient; and registering, by the storage manager: (a) a first association between the first subclient and a first snapshot of the first logical unit number, and (b) a second association between the second subclient and the first snapshot, wherein the first snapshot was generated and stored by a storage array.

The above-recited method wherein the unified-snapshot job, managed by the storage manager, generates at most one snapshot for a logical unit, regardless of the number of clients that store primary data to the respective logical unit number. The above-recited method wherein the first snapshot was generated based on the discovering operation performed by the storage manager. The above-recited method wherein the first logical unit number designates a portion of storage in the storage array. The above-recited method wherein the first logical unit number designates a logical unit of storage in the storage array.

According to yet another aspect, a method for snapshot management in a storage management system that comprises one or more snapshot-capable storage arrays hosting a plurality of logical unit numbers may be provided. The method may comprise: discovering, by a storage manager, a first subclient of a first client and a second subclient of a second client which is distinct from the first client, wherein the first client generates first primary data that is stored to one or more logical unit numbers in the plurality of logical unit numbers, and wherein the first subclient represents a logical grouping of part of the first primary data, and wherein the first subclient is associated with a storage policy, and wherein the second client generates second primary data that is stored to at least one of the one or more logical unit numbers storing the first primary data, and wherein the second subclient represents a logical grouping of part of the second primary data, and wherein the second subclient is associated with the storage policy; generating and storing, by a storage array during a unified-snapshot job, a snapshot of a first logical unit number that comprises data of the first subclient and data of the second subclient, wherein the unified-snapshot job, which is based on the storage policy, unifies the data of the first subclient in the first logical unit number and the data of the second subclient in the first logical unit number into at most one snapshot of the first logical unit number regardless of the number of clients that store respective primary data to the first logical unit number.

The above-recited method may further comprise: discovering, by a media agent component of the storage management system, the first logical unit number among the plurality of logical unit numbers, based on the logical unit number comprising at least data of the first subclient and data of the second subclient. The above-recited method may further comprise: discovering, by a media agent component of the storage management system, the first logical unit number among the plurality of logical unit numbers, based on the logical unit number comprising at least data of the first subclient and data of the second subclient; and instructing, by the media agent, the storage array that hosts the first logical unit number to generate and store the snapshot of the first logical unit number. The above-recited method wherein the storage manager manages the unified-snapshot job. The above-recited method wherein the storage manager manages the unified-snapshot job and also manages the storage management system. The above-recited method wherein the first logical unit number designates a portion of storage in the storage array. The above-recited method wherein the first logical unit number designates a logical unit of storage in the storage array.

In addition, one or more computer-readable media, excluding transitory propagating signals, may store instructions that, when executed by at least one component of a storage management system, may cause the component to perform one or more of the above-recited methods or portions thereof. Other methods, systems, and computer-readable media will also fall within the scope of the present invention, based on one or more of the above-recited illustrative methods, systems, and computer-readable media, and/or in any combination thereof.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A data storage management system for unified snapshot management, the storage management system comprising:
   a first computing device that hosts a first executable component and an associated first data agent;
   a second computing device that hosts a second executable component and an associated second data agent;
   a storage device in communication with the first computing device and the second computing device,
      wherein a logical unit number designates a logical unit of data storage in the storage device, and
      wherein the logical unit of data storage comprises first primary data generated by the first executable component and further comprises second primary data generated by the second executable component;
   a third computing device hosting a storage manager in communication with the first data agent and with the second data agent; and
   wherein the storage manager is configured to initiate a storage management job that generates at most one snapshot of the logical unit of data storage regardless of how many executable components generate and store primary data to the logical unit of data storage designated by the logical unit number.

2. The data storage management system of claim 1, wherein the storage manager is configured to initiate the storage management job based on a storage policy that governs snapshots for a plurality of executable components' primary data, including the first primary data generated by the first executable component and the second primary data generated by the second executable component.

3. The data storage management system of claim 1, wherein the storage management job is based on a storage policy that specifies storage management operations, including snapshots, for a plurality of executable components' primary data, including the first primary data generated by the first executable component and the second primary data generated by the second executable component.

4. The data storage management system of claim 1, wherein the storage management job that generates the at most one snapshot unifies snapshotted first primary data and second primary data, which are generated by different executable components hosted by different respective computing devices.

5. The data storage management system of claim 1 wherein the first executable component is at least one of an application, an operating system, a file system, and a virtual machine, and
   wherein the second executable component is at least one of an application, an operating system, a file system, and a virtual machine.

6. The data storage management system of claim 1 wherein the storage management job generates at most one snapshot of a respective logical unit of data storage in the data storage management system regardless of how many executable components generate and store primary data to the respective logical unit of data storage.

7. The data storage management system of claim 1 further comprising:
   a fourth computing device that hosts a media agent which is configured to discover: (i) one or more logical units of data storage that comprise first primary data generated by the first executable component, and (ii) one or more logical units of data storage that comprise second primary data generated by the second executable component; and wherein the storage management job generates at most one snapshot of a respective logical unit of data storage regardless of how many executable components generate and store primary data to the respective logical unit of data storage.

8. The data storage management system of claim 1 further comprising:

a fourth computing device that hosts a media agent which is configured to instruct the storage device to generate and store the at most one snapshot of the logical unit of data storage.

9. The data storage management system of claim 1 further comprising:

a fourth computing device that hosts a media agent which is configured to receive responsive reporting from the storage device in regard to the at most one snapshot taken of the logical unit of data storage.

10. A method for unified snapshot management in a data storage management system, the method comprising:

generating first primary data by a first executable component hosted by a first computing device;

generating second primary data by a second executable component hosted by a second computing device;

wherein the first primary data and the second primary data are stored by the respective first and second executable component to a logical unit of data storage configured in a storage array, and wherein the logical unit of data storage is represented by a first logical unit number accessible to the first computing device and to the second computing device;

initiating a storage management job, by a storage manager that manages the data storage management system, wherein the storage manager is hosted by a third computing device, and wherein the storage management job generates at most one snapshot of the logical unit of data storage regardless of how many executable components generate and store primary data to the logical unit of data storage represented by the logical unit number.

11. The method of claim 10, wherein the at most one snapshot unifies snapshotted first primary data and second primary data, which are generated by different executable components hosted by different respective computing devices.

12. The method of claim 10, wherein the storage management job that generates the at most one snapshot unifies snapshotted first primary data and second primary data, which are generated by different executable components hosted by different respective computing devices.

13. The method of claim 10, wherein the storage management job that generates the at most one snapshot is based on a storage policy associated with the first primary data generated by the first executable component and also associated with the second primary data generated by the second executable component.

14. The method of claim 10, wherein the storage management job that generates the at most one snapshot is based on a storage policy that governs snapshots for a plurality of executable components' primary data, including the first primary data generated by the first executable component and the second primary data generated by the second executable component.

15. The method of claim 10, further comprising:

discovering, by a media agent hosted by a fourth computing device, that the first primary data and the second primary data are stored in the first logical unit of data storage configured in the storage array.

16. The method of claim 10, further comprising:

instructing, by a media agent hosted by a fourth computing device, the storage array to take the at most one snapshot of the logical unit of data storage, based at least in part on the media agent discovering that the first primary data and the second primary data are stored in the first logical unit of data storage configured in the storage array.

17. The method of claim 10, further comprising:

associating the at most one snapshot of the logical unit of data storage with each of the first primary data and the second primary data.

18. The method of claim 10, wherein the first executable component is at least one of an application, an operating system, a file system, and a virtual machine, and wherein the second executable component is at least one of an application, an operating system, a file system, and a virtual machine.

19. The method of claim 10, wherein the data storage management system comprises a plurality of logical units of data storage respectively configured in one or more storage arrays; and wherein the storage management job generates at most one snapshot of a given logical unit of data storage among the plurality of logical units of data storage, regardless of how many executable components generate and store primary data to the given logical unit of data storage.

20. The method of claim 10, wherein each of the first computing device, the second computing device, and the third computing device respectively comprises one or more hardware processors and computer memory.

* * * * *